United States Patent
Boylan et al.

(10) Patent No.: US 9,119,042 B2
(45) Date of Patent: Aug. 25, 2015

(54) METHOD, COMMUNICATION MODULE, MESSAGE SERVICE SERVER AND SYSTEM FOR HANDLING OF AN EXTERNAL DEVICE

(71) Applicants: Vodafone Holding GmbH, Düsseldorf (DE); Vodafone Libertel B.V., Maastricht (NL)

(72) Inventors: Cornelius Boylan, Gangelt (DE); Friedhelm Rodermund, Koblenz (DE); Jeffrey Lammerts van Bueren, Susteren (NL)

(73) Assignees: Vodafone Holding GmbH (DE); Vodafone Libertel B.V. (NL)

( * ) Notice: Subject to any disclaimer, the term of this patent is extended or adjusted under 35 U.S.C. 154(b) by 24 days.

(21) Appl. No.: 13/849,023

(22) Filed: Mar. 22, 2013

(65) Prior Publication Data

US 2013/0303205 A1 Nov. 14, 2013

(30) Foreign Application Priority Data

Mar. 23, 2012 (DE) .................... 10 2012 102 543

(51) Int. Cl.
*H04W 4/00* (2009.01)
*H04W 4/14* (2009.01)

(52) U.S. Cl.
CPC .............. *H04W 4/14* (2013.01); *H04W 4/005* (2013.01)

(58) Field of Classification Search
CPC ........ H04W 4/005; H04W 4/14; H04W 4/001
USPC .............. 455/466, 452.1, 456.4, 445, 412.1; 370/335, 342
See application file for complete search history.

(56) References Cited

U.S. PATENT DOCUMENTS 6,091,958 A * 7/2000 Bergkvist et al. .......... 455/456.4
2002/0128024 A1 * 9/2002 Pusl ............................ 455/466
(Continued)

FOREIGN PATENT DOCUMENTS

EP         1 798 995        6/2007
WO    WO 2011/099774      8/2011

OTHER PUBLICATIONS

3GPP TS 23.040 V11.1.0 (Mar. 2012), 3rd Generation Partnership Project; Technical Specification Group Core Network and Terminals; Technical realization of the Short Message Service (SMS) (Release 11), 3GPP A Global Initiative, 2012.

*Primary Examiner* — Nathan Taylor
(74) *Attorney, Agent, or Firm* — Pandiscio & Pandiscio

(57) ABSTRACT

Method for handling at least one external device in an environment, wherein the environment comprises at least one central handling unit and at least one communication module, wherein at least one external device is assigned to the communication module, and wherein a dialogue session is established between the central handling unit and at least one of the further components of the environment, characterized in that, in the dialogue session at least one request message relating to the handling of the external device is transmitted, during the existence of the dialogue session a response message relating to the request message is generated, wherein the response message comprises handling information, relating to the handling of the external device, the response message is a confirmation message on the receipt of the request message at a component of the environment and the response message is transferred back within the same dialogue session.

3 Claims, 5 Drawing Sheets

(56) References Cited

U.S. PATENT DOCUMENTS

| | | |
|---|---|---|
| 2004/0008656 A1* | 1/2004 | Qu et al. .................. 370/342 |
| 2007/0156909 A1* | 7/2007 | Osborn et al. ............. 709/227 |
| 2009/0221310 A1* | 9/2009 | Chen et al. ................ 455/466 |
| 2010/0298012 A1* | 11/2010 | Damarla .................... 455/466 |
| 2011/0022884 A1* | 1/2011 | Kiessling et al. ........... 714/4.1 |
| 2012/0322457 A1* | 12/2012 | Lee et al. ................ 455/452.1 |
| 2013/0115982 A1* | 5/2013 | Stojanovski et al. ....... 455/466 |
| 2014/0073367 A1* | 3/2014 | Chou ......................... 455/466 |

\* cited by examiner

METHOD, COMMUNICATION MODULE, MESSAGE SERVICE SERVER AND SYSTEM FOR HANDLING OF AN EXTERNAL DEVICE

REFERENCE TO PENDING PRIOR PATENT APPLICATION

This patent application claims benefit of German Patent Application No. 10 2012 102 543.6, filed Mar. 23, 2012, which patent application is hereby incorporated herein by reference.

FIELD OF THE INVENTION

The present invention relates to a method for handling at least one external device in a network environment. Furthermore, the invention relates to a communication module for handling at least one external device in a network environment, a message service server for handling at least one external device in a network environment and a system for handling at least one external device in a network environment.

BACKGROUND OF THE INVENTION

In network environments, which may also be referred to as network environment, in particular in mobile radio communication environments, in particular cellular mobile communication environments, it is common practice to send short messages as text messages, so called SMS. For this purpose, a short message is generated by a sender and is sent to a recipient. For transmitting the short message, the sender has to provide an address as a unique identification of the recipient. This address is normally the mobile number of the recipient. The transmission of the short message is then carried out in such a way, that besides the short message and the address of the recipient, also the identity of the sender, most often in the form of the mobile number of the mobile phone of the sender, is first sent to a central station, for example a central distribution point. The central station then transmits the short message to the recipient.

For transmission of short messages it is for example known, that after sending of a short message an answer in form of a short message may be generated by the recipient. With this answer message the receipt of the short message may be confirmed. The answer message is generated and transmitted by the recipient. One disadvantage of this kind of communication is that the short message itself and the respective answer message are present in separate communications or dialogue sessions between the participating components of the network. In particular, the first short message from the sender to the recipient is transmitted in a mobile terminated session and the respective answer message is transmitted in separate mobile originating session.

Furthermore it is known, that the only way of initiating the establishment of a GPRS (General Packet Radio Service) communication from the network side is to send an SMS as a trigger to the device to establish a GPRS session. One disadvantage of this kind of communication is, that also therein separate communications or dialogue sessions for the transmission of the short message and the respective answer message are necessary. In addition, the usage of GPRS involves higher demands on radio coverage and the provided coverage is thus lower.

Finally, it is also known that a service centre such as a Short Message Service Centre (SMSC) offers a delivery report after a dialogue session. Also in this case, the delivery report is thus transmitted in a separate dialogue session.

Even though the sender may receive feedback on the successful transmission of a short message by means of such answer messages or delivery reports, it is, hence, disadvantageous, that the feedback, in particular the confirmation that a short message has been delivered, in general is carried out via different communication channels and in addition is carried out in a time shifted manner and thus not in real time.

In addition to transmission of short messages between mobile devices of users, in particular people, also the transmission of short messages between technological components, for example external devices, is also known. Such communication is also referred to as machine-to-machine-communication or M2M-communication.

Machine-to-machine-communication in particular denotes the information exchange between technical components, such as machines, automatic units, vehicles, containers or a central control centre. Use cases may be, for example, the remote monitoring, the remote check, the remote control and remote maintenance of machines, appliances and systems.

Such remote control may, for example, be carried out by means of short messages. For such remote control, a short message may, for example, be sent from a central station, which is also referred to as control centre, to a machine. The short message may, for example, contain a command or order for the machine. When the short message has been sent from the central station to the machine, the central station may obtain feedback, that the short message has been delivered, according to the above mentioned answer or delivery report systems. As the machine in general is not capable of communicating via short messages, only the delivery of the short message to a communication unit which is connected to the machine can be confirmed. After sending the short message, which for example includes the command for the machine, the central station, however, does not obtain any feedback on whether the command has actually reached the machine and whether the command has been carried out or observed by the machine or any other information on the impact of the short message.

With the options known from the state of the art, it is thus disadvantageous, that the sender does not receive conclusive and immediate feedback, whether information, for example a command, which has been transmitted to an external device by using a short message, has actually reached the external device and whether the command has been performed by the external device. Thus an unknown status is generated, which can for example be referred to as "command sent, but not confirmed".

The present invention is based on the problem of providing a method, a communication module, a message service server as well as a system, which allow for providing information, whether and to which extent requests, which have been transmitted by means of short messages to a component of the system, in particular to an external device, for example a machine, or to a central handling unit have reached the external device or central handling unit, respectively, and have been performed and carried out. In addition the provision of the information should be simple to implement and the information should be provided promptly, preferably in a real-time manner and most importantly avoiding an ambiguous state of command execution.

SUMMARY OF THE INVENTION

The invention is based on the finding, that this problem can be solved by using existing structures and resources for transmission of the information.

The problem is solved according to the invention by the method with the features according to the independent patent claim as well as by the communication module with the features according to the independent patent claim. Furthermore, this problem is solved according to the invention by a message service server with the features according to independent patent claim as well as by the system with the features of the independent patent claim. Further features and details of the invention are given in the dependent claims, the description and the figures.

Therein, features and details, which are described in context with the method of the invention, are of course also valid in context with the communication module of the invention, the message service server of the invention and the system of the invention and respectively vice versa, so that with respect to the aspects of the invention mutual reference is made and is incorporated by reference.

According to the first aspect of the invention, a method for handling at least one external device in an environment is provided. The environment comprises at least one central handling unit and at least one communication module, wherein at least one external device is assigned to the at least one communication module. The environment will hereinafter also be referred to as surrounding. A dialogue session is established between the at least one central handling unit and at least one of the further components of the environment. The method is characterized in that in the dialogue session at least one request message relating to the handling of the external device is transmitted, that during the existence of the dialogue session a response message relating to the request message is generated, wherein the response message comprises handling information, relating to the handling of the external device, the response message is a confirmation message on the receipt of the request message at a component of the environment and in that the response message is transferred back within the same dialogue session.

The method according to the present invention serves for handling at least one external device. The term handling is a generic term. For example, when handling an external device on the one hand information may be transmitted to the external device. On the other hand, it is possible to transmit information from the external device to a different unit. The transmission of information from the external device may, for example, also be a transmission of information from the external device back to the unit, in particular to the central handling unit, which beforehand had sent information to the external device. Furthermore, information from the external device may be sent to the central handling unit and information may then be transmitted back from the central handling unit to the external device.

Information may be, for example, data or signals gained from asset controllers or modular sensors. Where the handling comprises transmission of information to an external device, the transmitted information preferably represents a request and may be, for example, an order, which hereinafter will also be referred to as a command. Handling may thus be taking influence on the external device. Preferably, handling of an external device comprises the transmission of information in the form of a command to the external device as well as the sending of information as a response, which gives an indication on whether and if so how the command has been considered by the external device. Furthermore, handling may comprise the transmission of information from the external device to the central handling unit.

The term handling thus comprises different actions. The term handling may for example be understood as a synonym for the terms controlling, regulating, managing, monitoring, organizing, addressing, operating or actuating.

The term handling may comprise, for example, controlling of an external device. This means that handling may be understood as a unidirectional as well as a bidirectional transmission of information to or from the external device. Herein, the actuating command is transmitted to the external device and the result of the actuation is transferred back as a response. The term handling may be, however, also be associated with contacting an external device. It is also possible, that the term handling is understood as monitoring or operating of an external device.

Besides the mere transmission of information, the handling may also comprise the managing, the processing and potentially actions performed based on received handling information. Also capturing of operational measures, in particular by means of the received handling information may be part of the handling. Herein the handling may be in particular the querying of a status of an external device as well as the transmission back of the queried status. The thus received queried status may be further processed at the central handling unit, for example analyzed and respective steps may be initiated.

According to the invention, the handling is to be carried out for at least one external device. The external device may for simplicity sake also be referred to as device.

The external device is in particular a technical component, which may also be referred to as component or appliance. The external device is thus in particular a component, which is a machine, part of a facility or part of a system. An external device thus preferably refers to a mechanical, hydraulic and/or electrically driven component. Examples of external devices are in particular flow manipulating means, traffic routing means, security means, monitoring means, detection means and the like as well as their individual parts or elements. Specific examples for external devices are thus flow manipulating means, such as pumps, sluices, means for changing lane with transport means in the form of rail switches, sensors, traffic lights, illumination devices, in particular street lights, traffic monitoring means, traffic routing means, security means, such as for example an alarm system, access monitoring means, monitoring and data collection means for buildings, vehicles and air crafts, fire protection means, counters and the like. The present invention can thus advantageously be used in public infrastructures.

According to the present invention, handling information or information relating to the handling of the external device may be information which is generated and/or is determined or detected based on a request to the external device. In particular, the handling information may be results, derivable from actions on the device and/or values, which are for example determined by means of sensors. Examples for handling information are thus status data or condition data of the device, sensor data, which is measured in or at the device, counter readings or the like. Alternatively, handling information may be information obtained from the central handling unit with respect to management of external devices. For example, the receipt of information of a status of an external device at the central handling unit may be handling information according to the present invention.

The external device or the external devices, the communication module, the message service server and/or the central handling unit according to the present invention may also be referred to as technical components and hereinafter will also simply be referred to as components. These components can form the environment together with other components.

The external device is situated in an environment and is preferably part of the environment. According to the invention, the environment comprises besides the external device at least one central handling unit and at least one communication module, wherein at least one external device is assigned to the at least one communication module. Thereby, more than one external device can be assigned to one communication module. For sake of simplicity, hereinafter reference will mostly be made to one single external device which is assigned to the communication module in the description of the invention.

The term "assigned" expresses a certain vicinity or connection between the communication module and the external device. The term assigned may also be replaced by the term associated. The external device which is assigned to the communication module may be in close local proximity or may be arranged on the communication module or vice versa. An assignment of an external device to a communication module may, however, also mean, that a connection between these two components exists or can be or should be established. This connection may also be a permanent connection. It is, however, also possible, that such a connection is only established based on certain events.

The environment comprises at least one central handling unit. A central handling unit which can also be referred to as handling unit, in particular refers to a unit or appliance, which is designated for handling the external device or from which the handling of the external device may be performed. That means that the information, which is transmitted to the external device for handling of the external device, may be transmitted from the central handling unit. It is, however, also possible, that information originating from the external device is transmitted to the central handling unit in form of a request and that this information, for example, the status of the external device is managed, stored or otherwise processed at the central handling unit and the respective action taken on the central handling unit is then transferred back to the external device as handling information. The central handling unit may be a central control unit, which may also be referred to as central station or central control centre, or the like. The central handling unit is preferably designed for the communication with the further components of the environment. In addition, information is preferably processed and potentially stored at the central handling unit. The central handling unit may have a unit for establishing a communication connection with at least one component of the environment for the communication. This unit is preferably connected to an application or is an application, within which the handling of the at least one external device is at least partially carried out. In this application, messages may be generated and messages may also be processed, in particular information may be extracted from messages. Also the management of received information may be performed by the application. Furthermore, preferably the communication of the central handling unit with the further components of the environment is monitored in the central handling unit, for example in the application.

Furthermore, the environment comprises a communication module. A communication module refers to a module, at which information can be received, processed, amended, transferred and/or sent. Most preferably, the communication module is designed for communication in a communication network. A communication module may be a transceiver assembly as well as the corresponding components for actuating an external device. A communication module thus enables the communication, that means is designed for communication and may thereby act as operator or distribution point between two technical components. The communication may be carried out with the communication module as well as via the communication module.

In a communication via the communication module for example the central handling unit sends information which is to be transmitted to the communication module. The communication module can then transfer this information. The communication may be carried out according to a communication standard, wherein the communication module for example assumes the sending protocol as well as the receipt protocol, the encryption and management of information. The communication between the communication module and the external device may be by means of wire connection as well as wireless, wherein a wireless communication is preferred. The transmission may for example be a transmission according to the Bluetooth or Zigbee standard. Also a communication from the external device via the communication module is possible according to the present invention. In that case, the request is sent from the external device, received at the communication module and transmitted to the central handling unit.

The present invention is not limited to certain communication modules. Examples for communication modules are amongst others a radio module and the like.

At least one external device is assigned or associated to the at least one communication module. That means, that a connection between the communication module and the external device exists or can be established. This connection may, as already mentioned above, be a permanent connection. It is, however, also possible, that the connection does not exist permanently, but is only established when needed. If the connection has to be established when required, however, an assignment of the external device to the communication module has to be ensured beforehand. That means that an association of the communication module and the external device has to be defined. The assignment may also be understood in such a way, that the communication module is part of the external device, that means that the external device comprises the communication module. In this case the communication module may for example be mounted into the external device or otherwise integrated into the external device. It is for example possible, that the communication module is an independent component, which is or can be plugged into the external device.

The environment may according to the invention also comprise at least one external device. Thereby, the environment is not only formed by components of a communication network such as a mobile communication network but also by the external devices.

Furthermore, according to the invention a dialogue session is established between the at least one central handling unit and at least one further component.

A dialogue session may also be referred to as a communication session. A dialogue according to the invention refers to a bidirectional communication between at least two components of the environment. A dialogue herein comprises preferably the sending of information from a first component to a second component and the receiving of information from the second component at the first component. The received information is contextually linked or related to the sent information. The received information may for example be a response to a request, which presents the sent information. In addition or alternatively, the received information in that case may also comprise an indication on the transmission or sending status of the request or the response. The sent information may herein contain the type of transmission of the request or response and/or indications on the recipient and/or sender. Dialogues according to the present invention may for example be established between the external device and the communication module as well as between the communication module and the handling unit. The dialogues may be direct or may be carried out via further components.

Preferably, the transmission and/or sending according to the invention consist of several dialogues, which are built upon one another and which together are also referred to as a dialogue chain. The dialogues in such a dialogue chain are concatenated, that means interleaved or nested in each other or are independent from each other. That means that in a dialogue, in particular in a response message of a dialogue, the result of at least one further dialogue which is performed downstream, is included. This specifically means, that for example a request message is transmitted from a first component to a second component. Due to this request message, the dialogue between the first and second component, which is also referred to as first dialogue, is opened. Upon receipt of the request message at the second component in turn a new, second dialogue to a third component is opened by transmitting or transferring a request message or of a request which was included in the request message. The response or response message of the third component is sent back to the second component, whereby the second dialogue is terminated. The result or outcome of the second dialogue is included in the response message of the first dialogue and is transmitted to the first component. Thereby also the first dialogue is terminated with the outcome of the request delivered end to end by means of concatenated dialogues reaching from one component to another. According to the present invention, all dialogues within the dialog chain are preferably established either in mobile originated (MO) or the mobile terminated (MT) direction.

A dialogue session according to the present invention is a session, which is established from a component by generating and/or transmitting of a request message and which is terminated by detecting of an event. The event may be the receipt of a response message to the request message and/or the expiration of a predetermined time period.

With the transmission of the request message from a component, a dialogue is opened. The dialogue session may already exist or may be established by the transmission of the request message. During the dialogue session thus at least one dialogue is performed. If, as preferred according to the invention, several dialogues are performed, at least one dialogue chain is pursued during the dialogue session. It is also possible, that during the dialogue session, several dialogue chains are pursued. Preferably in the dialogue session according the present invention at least one concatenated dialogue chain is pursued, which reaches from the central handling unit to the external device. The end of the dialogue session is preferably monitored by the component, from which the dialogue session had been established.

If the event, by which the dialogue session is terminated, is the expiry of a duration or time period, transmission resources for the transmission of the information may be reserved during the dialogue session. In this case, the dialogue session can also be referred to as a tunnel or communication tunnel. It is, however, also possible and preferred, that during the predetermined time period no transmission resources are reserved, but only at the component from which the dialogue session had been established, a timer is running, which monitors the expire of the time period and marks the dialogue session as terminated after expiry of the time period.

If the event which terminates the dialogue session is the receipt of a response message, also this may be monitored at the component, from which the dialogue session had been established. Reservation of resources on the transmission path during the dialogue session is, however, not mandatory in that case.

According to the invention, it is also possible, that despite the fact that a response message has been received at the component, from which the dialogue session had been established, the dialogue session is not terminated, because a predetermined time period has not yet expired.

Preferably, the response message is received at the component, from which the dialogue session had been established, via the same interface, via which the request message had been transmitted. This interface is thus preferably kept open during the dialogue session.

In a dialogue session, preferably an exchange is performed between two or more technical components, for example the central handling unit and a communication module. This exchange may concern information, data, signals and the like. Hereinafter for sake of simplicity reference is only made to an exchange of information. In a dialogue session information may be sent from one technical component, for example the central handling unit, to another technical component, for example the communication module. This sending of information is carried out in a dialogue chain, preferably in an concatenated dialogue chain. Herein information is transmitted back in one single dialogue session. That means that information from the communication module is transmitted back to the central handling unit in the same dialogue session which is used for the original transmission of information from the central handling unit to the communication module. Thereby, the dialogue session is performed as a bidirectional communication. The dialogue session according to the present invention corresponds to the concept of a TCAP dialogue session which is defined by ITU and 3GPP.

A dialogue session is established between the central handling unit and at least one further component. That means that both technical components participate in the dialogue session. It is possible, that further technical components participate in the dialogue session and/or that the dialogue session is established via further technical components. In particular, a dialogue chain is established during the dialogue session from the handling unit all the way to the external device or from the external device all the way to the central handling unit. The dialogue session hence represents an end-to-end dialogue session.

A dialogue session may for example be content or context related and/or time related. That means that a dialogue session between the central handling unit and the communication module is established due to an event, for example a request, which may represent a command. This means that for example information is transmitted from the central handling unit to the communication module. The dialogue session in this case relates to the content or context of the information. The term communication context may thus be used as a synonym for dialogue session and is hereinafter also referred to as context. In the case of an context related dialogue session, a dialogue session may be opened with the generating and/or transmission of the request message and is kept open until the corresponding answer message has been transmitted back to the central handling unit, if the transmitted information is a request, for example in the form of a command, upon which the communication module is supposed to send a response back to the central handling unit. That means that the dialogue session is maintained, until all necessary information, that means all information relating to a context, has been exchanged between the central handling unit and the communication module.

In addition to having a contextual relation, the dialogue session may also have a time relation. For example it is possible, that a dialogue session is opened due to a request and that the dialogue session is terminated due to a time limit.

This situation may in particular arise, if the transmission back of the response from the communication module to the central handling unit takes too long. In a mobile environment, in particular a GSM network (Global System for Mobile Communications), a dialogue session may for example be limited to a few seconds, that means may be terminated automatically after this time period.

A dialogue session is established between the central handling unit and at least one further component of the environment, preferably the communication module. According to the invention a distinction is made between the terms "in a dialogue session" and "during a dialogue session".

The term "in a dialogue session" or "within a dialogue session" is understood such that within a dialogue session, which exists between two components, information is exchanged between these components. The term "in a dialogue session" can thus be understood in a time related sense or in a location related sense. Time wise, information is transmitted in the dialogue session as long as the dialogue session exists or is open. With respect to location, information is transmitted between appliances, between which the dialogue session exists or which participate in the dialogue session, for example the central handling unit and the communication module.

The term "during the dialogue session" is in particular understood in a time related manner. That means that the central handling unit and/or the communication module transmits information to a different component, for example the external device during the time, in which the dialogue session exists, that means the event which terminates the dialogue session has not yet occurred. During the dialogue session for example a dialogue between the communication module and the external device may be carried out as part of a preferably concatenated dialogue chain.

According to the invention, it is provided, that in the dialogue session at least one request message which relates to the handling of the external device is transmitted.

As explained above, the transmission of a request message is performed in the dialogue session. The information, which is transmitted between the central handling unit and preferably the communication module, is a request, which relates to the handling of the external device. That means that the request message relates to the handling of the external device.

The request message thus contains a request, which relates to the handling of the external device or is directed to this handling. The request message may be started or generated by an application, which is also referred to as a program. This application may be assigned to the central handling unit or may be provided therein, that means may for example be installed and executed on the central handling unit.

According to the invention it is further provided, that during the existence of the dialogue session a response message is generated which relates to the request message, wherein the response message comprises handling information which relate to the handling of the external device. A request message is understood as a message which contains at least one request. The request in turn, as already explained above is for example a command or order. A response message is understood as a message, which contains at least one response to the request. The response is in particular handling information, which has been determined based on the request.

The response message is generated during the existence of the dialogue session. That means that is in general possible that information, which is necessary for the response message, is generated or obtained. This information, which according to the invention is handling information relating to the handling of the external device, can for example be received from the external device. That means that during the dialogue session a connection to the external device can be established. Via this connection the handling information relating to the handling of the external device can be received and this information can then be integrated into the response message. That means that the response message comprises handling information, that means handling information which relate to the handling of the external device. The handling information is transmitted from the external device to the communication module during the dialogue session in a dialogue which forms part of a dialogue chain.

The response message is transmitted back within the same dialogue session. That means that the response message is transmitted back to the component or appliance, which had sent the request message. The back transmission or transmitting back is carried out in the same dialogue session. In particular, the term "in the same" dialogue session within which the response message is sent, relates to the dialogue session, which has been established by the corresponding request message and which still exists. In particular, it does not relate to a dialogue session which is established later, in particular after the first dialogue session has been established. This is an essential difference towards methods according to the state of the art, in particular towards short message transmission methods, within which a confirmation of a transmission of a short message is only transmitted after the end of a dialogue session in a new dialogue session to the sender.

According to the present invention, the response message is a confirmation message on the receipt of the request message at a component of the environment. By using such a message as a vehicle for transmitting handling information several advantages may be obtained. In particular, by using a confirmation message for the transmission of the handling information as a response message, the association of the response message to the respective request message at the central handling unit is simplified. This is in particular true as a confirmation message by nature has to contain information on the message, the receipt of which is confirmed thereby. In addition, as the response message according to the present invention is transmitted in the same dialogue session as the request message, the association between the response message and the corresponding request message is further simplified.

The method according to the invention can also be explained with reference to the following example in a simplified manner.

An environment comprises a central handling unit, a communication module and an external device. If the central handling unit wants to transmit a command to the external device, the central handling unit can transmit a request to the external device. This is performed in such a way, that the request is first transmitted in a request message from the central handling unit to a communication module.

With establishing of the request message or at the beginning of the transmission of the request message a dialogue session is opened. Simultaneously, a dialogue to the communication module is opened. This dialogue may include further components, for example a message service server. When the request message has been transmitted from the central handling unit to the communication module, the request, in particular the command, is extracted and transmitted from the communication module to the external device. This transmission, which is also referred to as transfer, thus opens a further dialogue, while the first dialogue between the handling unit and the communication module is still open, that means no response message has been received at the handling unit. The external device may then perform the request, for example the command.

Before the dialogue session is terminated, it is forseen that a response message is transmitted back from the communication module to the central handling unit. The response message relates to the request message. For establishing or finalizing the response message in this example, the communication module may wait for feedback from the external device. This means that the dialogue between the handling unit and the communication module is kept open while the communication between the communication module and the external device is carried out. The external device then transmits information to the communication module in the form of a response, whether or how a command, that means the request, has been observed. The request to the external device and the response from the external device thus form a dialogue between these components. With this response, which comprises handling information, a response message is generated or modified and transmitted back to the central handling unit. That means that the dialogue session at least exists until the response message has been transmitted back. Simply put, the dialogue session is maintained at least until a response message which relates to the request message has been transmitted back. The response message thus not only comprises a confirmation that a request message has been transmitted to the communication module but also contains additional information, wherein the additional information is handling information of the external device. With the transmission of the response message to the handling unit, also the dialogue with the communication module is closed. Since the dialogue between the handling unit and the communication module is kept open during the dialogue between the communication module and the external device, an interleaved dialogue chain from the handling unit to the external device is generated. This chain is pursued during the dialogue session.

The communication between the central handling unit and the communication module or the external device and vice versa may also be referred to as machine-to-machine (M2M) communication. This machine-to-machine communication can be optimized with the method according to the invention.

With the method according to the invention as already explained above it is possible to transmit a response message which relates to the handling of an external device with handling information back to the sender of the request message.

As the response message is a confirmation message on the receipt of the request message at a component of the environment, the method thus uses existing resources for transmission of handling information. In particular messages, which are generated and used for a different purpose, namely the confirmation of the receipt of a message, is used according to the information to transmit information, which for example provide indications on whether and how the transmitted request has been processed by the external device or has been considered.

As the transmission back of the response message is performed in the same dialogue session, in addition, the association or linking of the response message to a request message is facilitated. This is because, especially in a mobile terminated dialogue session the central handling unit has opened a dialogue session, for example with respect to a request in the form of a request message and by the response message obtains the corresponding contextual handling information, whereby the dialogue session can be closed or terminated. It is, however, also possible in particular with time wise limited dialogue sessions that after receipt of the response message, the dialogue session is maintained open and potentially a further dialogue or a further dialogue chain is established.

According to a preferred embodiment, the generation of the response message is triggered by the receipt of the request message at a component of the environment. In one embodiment, the generation of the response message is triggered by the receipt of the request message at a communication module. Triggering the generation of a response message according to the present invention may in particular include the establishment of the message. However, finalization of the response message and transmission to a further component, in particular the central handling unit is preferably not triggered by the receipt of the request message at the communication module. This finalization and transmission is preferably postponed until the requested handling information is received at the communication module from the external device.

The component at which the request message is received and where the confirmation message is established may be the communication module in case of a mobile terminated dialogue session, i.e. from the central handling unit to the external device. In case of a mobile originated dialogue session, i.e. where the dialogue session is established from the external device to the central handling unit, the component where the request message is received and the respective confirmation message is established, preferably is the message service server.

As the generation or establishing of the response message is automatically triggered by the receipt of the request message, and this response message is subsequently used for transporting handling information for example to the central handling unit, the method of the present invention if further facilitated. In particular, no generation of a separate message such as a separate SMS which would have to be transmitted to the central handling unit in a separate dialogue session is necessary.

According to a further preferred embodiment, the response message is an RP-ACK message. Such a message is used in the communication between a Short Message Service Centre SMSC and a module or modem for confirming receipt of a message at the modem or module. The RP-ACK message is in particular normally sent between the SMSC and a mobile station in both directions and is used to relay the acknowledgement of a RP-DATA or RP-SMMA message reception. The information elements are defined in the standards 3GPP TS 23.040 and 3GPP TS 24.011.

As this RP-ACK message is standardized and its generation is part of a protocol which is followed in normal SMS transmission, the implementation of the present invention is facilitated. In particular, as the RP-ACK message serves as part of a standardized SMS transfer, and in the present invention servs as a vehicle for transporting handling information from a communication module to a central handling unit or from a central handling unit to a communication module, no additional dialogue session has to be set up.

According to the a preferred embodiment, the request message is either a mobile terminated or a mobile originated message. Mobile terminated messages are also referred to as MT messages and mobile originated messages are also referred to as MO messages. As the response message to the request message according to the invention is a confirmation message on the receipt of the request message and is preferably triggered by the receipt of the request message at a component, the dialogue session which is established by the request message, is also used for the response message. Thereby network resources, which are necessary for the present invention are lower than the resources which would be required for a mobile terminated request message which is followed by a mobile originated response message, as a separate dialogue session would be necessary. The present invention is mainly described with respect to mobile terminated request messages. It, however, also applies to mobile originated request messages. The communication flow in that case is then reversed.

The request which is contained in the request message and the handling information which is contained in the response message are preferably transported between the central handling unit and the external device in a dialogue chain consisting of at least two interleaved dialogues during the dialogue session. A dialogue chain with interleaved dialogues according to the invention in particular means that one dialogue is kept open while a subsequent dialogue is performed. Thereby it is possible to provide necessary information in real time and to integrate this information in previous dialogues. In particular, it is possible to integrate information which is obtained from a dialogue between the communication module and the external device into a response message which is sent from the communication module to the central handling unit, potentially via a message service server.

According to a preferred embodiment, the transmission of the response message from the component which receives the request message, is triggered by the receipt of handling information from a different component, in particular the at least one external device in case of a mobile terminated dialogue session or the central handling unit in case of a mobile originated dialogue session. The component, which receives the request message and from which the response message is transmitted is preferably the communication module to which at least one external device is assigned to. As according to the preferred embodiment, the transmission of the response message from the communication module is triggered by the receipt of handling information, rather than by the receipt of the request message itself, it is possible to include the handling information from the external device into the response message. A need for establishing a different dialogue session for transmitting such handling information does hence not exist.

As already explained in the above example, the request message is preferably transmitted in the dialogue session from the central handling unit in the direction of the communication module. In the direction of the communication module in this context means, that the request message is transmitted directly or indirectly to the communication module. In such a case, the response message is sent back from the communication module in the direction of the central handling unit, that means is directly or indirectly transmitted back to the central handling unit.

In general, the present invention is, however, not limited to this transmission path. In particular, the request message may be transmitted in the dialogue session from the external device towards the central handling unit. This transmission path represents a mobile originated transmission.

The preferred transmission from the central handling unit to the communication module provides the advantage that the handling information which relate to the handling of the external device can be transmitted in a fast and simple manner from the external device to the communication module, due to the fact that the communication module is assigned to the external device, and can be transmitted back to the central handling unit with the response message, which is sent from the communication module to the central handling unit.

Preferably, the handling information, which is transmitted in the response message, is received by the communication module and the handling information is integrated into the response message. Alternatively a mobile originated dialogue session, the handling information is received by the message service server and is there integrated into the response message.

As already explained above, the request message can be transmitted from the central handling unit to the communication module. The request from the request message can be transmitted to the external device from the communication module in a dependent dialogue. The external device can process the request and on the basis of the request can transmit handling information, for example in the form of a response, back to the communication module, so that the communication module receives the handling information. Thereby the dialogue between the device and the communication module is terminated. The handling information is in particular information, which relates to the request. If for example a counter reading is queried with the request, the handling information may comprise the counter reading of the external device. Also a pump may receive the command with the request to increase the delivery volume. In this case, the handling information can contain information on that the pump has increased the delivery volume. Also a machine may receive a command to change the status with the request. This change of status may for example be the switching on or switching off of the machine. The response to such a request in that case may for example be "machine on" or "machine off". The communication between the central handling unit and the external device is thus also referred to as M2M communication.

According to the invention, the handling information is integrated into the response message. This means that the handling information becomes part of the response message. Therein, the response message may already exist or may be generated upon receipt of the handling information, in particular at the communication module. The response message may also only comprise the handling information. It can, however, also be envisioned, that the response message besides the handling information also comprises or contains further information. The response message may preferably, for example, in addition also comprise confirmation information, which confirms the transmission of the request message to the communication module and/or the transmission of the request to the external device.

The handling information can be integrated into the response message in several ways. For example the handling information may be integrated into the response message while the response message is being generated or created.

If the central handling unit for example receives a response message with a confirmation that the request message has been transmitted to the communication module, further information for example on that the request has been transmitted to the external device or that the external device has received and/or processed or considered the request, can be transmitted to the central handling unit in this response message. Thereby it is possible, that responses to requests with respect to status or queries of the external device can be transmitted to the central handling unit.

Since the transmission of the response message back is carried out in the same dialogue session, in addition a unique assignment or linking of the response message to the request message is provided. At the central handling unit the request message which was originally sent can easily be associated to the response message which is received within the same dialogue session. The management of the handling information at the central handling unit is thus improved or at least simplified. It is for example possible to revert to emergency or secondary processes in case of a transmission error. That means in case of lack of response message or in case of receipt of a response message that the transmission has not been successful appropriate counter means can be initiated. In that case for example the request message may be transmitted again. As the response message is received within the same dialogue session, a real time address of such problems is possible with the present invention.

As already explained above, the response message may be a predefined or standardized response message, which is already generated for different purposes. According to one embodiment, the response message is generated in the communication module. Preferably, the generation of the response message is triggered by the receipt of the request message at the communication module. The response message may thus be generated upon receipt of the request message but may be amended on the basis of handling information which has been transmitted from the external device to the communication module on the basis of the request. In particular the handling information which is received from the external device may be integrated into the response message before transmission of the response message to the central handling unit. In a mobile originated dialogue session, the response message is preferably generated in the message service server and the generation of the response message is triggered by the receipt of the request message at the message service server.

The response message, which is transmitted according to the invention, preferably comprises different fields and one of these fields may be used for the transmission of the response. According to the invention, the response message is a confirmation message on the transmission of the request message. The generation or creation and transmission of confirmation messages with SMS—short message systems is for example described in 3GPP standards TS 23.040 and TS 24.011.

Preferably, the response message, in particular the response message which is sent from the communication module to a message service server, is the above mentioned RP-ACK message, which is hereinafter also referred to as RP-ACK, and the handling information is implemented into a TP-User-Data-Field of the RP-ACK message. An RP-ACK message comprises different fields. For example, the RP-ACK message comprises an SMS-Delivery-Report. The SMS-Delivery-Report in turn is part of the RP-User-Data, which is part of the RP-ACK message. Furthermore, the SMS-Delivery-Report contains a TP-User-Data-Field, which in general is used for transmission of header information and potentially of the originally transmitted message. According to the invention, the handling information can be implemented into this field, wherein the TP-User-Data-Field in such a case may contain further information besides the handling information. It can, however, also be envisioned, that in the TP-User-Data-Field only the handling information is implemented.

Since the response message is an RP-ACK message and the handling information is implemented in the TP-User-Data-Field of the RP-ACK message, existing resources are used, so that the transmission is carried out with minimal resource requirements and fields which have already been defined in messages can be used. Also the implementing is possible in a simple way, as for example the known method of confirming the transmission of a message, which is generally known and is already implemented in systems, is supplemented.

According to the invention, for the transmission of handling information preferably a method is used, which can also be referred to as transactional method. In particular a dialogue is opened at a component, in particular a message service server rather then storing and forwarding of a short message, which is the request message. In this dialogue the request message is immediately forwarded and a transmission confirmation is requested of the receiving component. This dialogue, which is generated in particular between the message service server and the communication module, can also be referred to as ForwardShortMessage MAP TCAP Dialogue. Since according to the present invention, handling information is obtained via a further dialogue of the communication module with the external device while the first dialogue is still open, the handling information can be included in a response message of the ForwardShortMessage MAP TCAP Dialogue.

According to the invention, the dialogue session and thus the transmission of messages can be established directly between the central handling unit and the communication module. Preferably, the dialogue session is, however, established via a message service server. The message service server may in particular be a Short Message Service Centre, which may be abbreviated as SMSC.

A Short Message Service Centre is in particular part of a Global System for Mobile Communications (GSM)-, or Universal Mobile Telecommunications System (UMTS)- or Long Term Evolution (LTE)-mobile communication network. A Short Message Service Centre may be in charge of storing, forwarding, converting and delivering of messages of the Short Message Service.

The message service server may be provided between the central handling unit and the communication module. That means that the transmission of messages between the central handling unit and the communication module can be performed via the message service server. Therein, the request message and/or the response message are transmitted via or by the message service server.

Since the dialogue session and also the dialogue chain is established via a message service server, in particular a Short Message Service Centre, the message service server becomes part of the dialogue session and the dialogue chain and a modification of the messages, that means of the request message and the response message can be performed in a simple manner.

Preferably, a modification of the response message is performed at the message service server.

In particular the response message, which is transmitted back from the communication module in the direction of the central handling unit and which is transmitted back via the message service server is transmitted to the message service server from the communication module. This response message, which has been generated at the communication module or into which information has been integrated at the communication module, is hereinafter also referred to as triggered response message. The response, that means the handling information, which is contained in the response message, can be resorted within the response message or sorted again or placed differently within the response message. After modification, the response message is also referred to as modified response message. As already explained above, the response message has different fields, where information is contained. For example, the handling information, which is contained in the response message, may be contained in a field or may be stored in the field. If a modification of the response message is performed at the or in the message service server, this modification may for example be performed such that the handling information, which is stored in a specific field of the response message, is removed from that field. In order to avoid loss of the handling information, the removed handling information is stored or written into a different field. It is also possible, that besides removing and newly placing of the handling information within the response message a new creation of a field is provided between the removal and the newly placing. In that case, the handling information is first removed and—if the field into which the handling information is to be inserted, is not yet present in the response message—the required field is generated during the modification. Thereafter, the removed handling information are stored or written into the corresponding field.

Preferably, the handling information may be removed from the response message or read from this message and may then be integrated or stored into a different or new response message. This new response message, which may also be referred to as modified response message may for example be generated at the message service server. With this modification, it becomes possible to integrate the information, which had been obtained from the dialogue between the communication module and the message service server, for example the delivery confirmation, into a response message of a dialogue between the message service server and the central handling unit. In addition, preferably also handling information which has been obtained from a dialogue between the communication module and the external device is integrated into the modified response message. The modification and potentially generating of a new response message is performed in the same dialogue session within which also the original or initial request message had been sent from the central handling unit.

If the response message which is transmitted back from the communication module is an RP-ACK message, the handling information may be stored in the TP-User-Data-Field of the RP-ACK message. A modification of the response message can be carried out in such a way, that at or in the message service server the handling information is taken from the TP-User-Data-Field of the RP-ACK message or read there from and is input into a new response message. For example the handling information can be taken from or read out of the TP-User-Data-Field of the RP-ACK message and can be input into the SMPP data_sm_response, which is transmitted from the message service server to the handling unit. As an alternative to the SMPP data_sm_response, which is part of the dialogue between the central handling unit and the message service server, also a SOAP xml API operation (Simple Object Access Protocol xml Application Programming Interface) can be used. In that case the dialogue between the handling unit and the message service server is carried out via a SOAP interface.

After modification of the response message, the response message is then transmitted further back to the central handling unit.

The advantage of such a modification is that the modified message can be a message which complies with the standards or protocol of communication between the message service server and the handling unit, while the messages, which are transmitted in the dialogue between the message service server and the communication module can correspond to a different standard or protocol.

Also for example a request message, which had been transmitted from the central handling unit to the communication module, can be modified or changed in the or by the message service server. For example, the request message which is transmitted from the central handling unit may be the original request message. By modification in or by the message service server, the original request message may change to an extended request message. This can be performed in such a way, that additional information is added to the original request message. For example, this can be performed in such a way, that in the message service server, the request message is supplemented with an additional demand with respect to a response message. This demand is a demand of the message service server to the communication module. In particular the demand may be a demand for transmission of a delivery confirmation. The request message may be supplemented with such a demand at the message service server. In this example such a demand was not contained in the original request message.

As modification of the response message and/or request message additional information may thus be implemented into the message. This information may for example be a timestamp or date stamp. It is also possible to conduct a kind of monitoring by the message service server. The message service server may for example monitor the dialogue session. In addition, the message service server may also monitor the transmission of the request message to the communication module.

As already explained above, the messages may be of different kinds. Preferably, the request message is a short message, in particular a text message or binary message, or comprises such a text message or binary message. Also the response message may be a short message, in particular a text message or binary message and/or may comprise a text message or binary message.

The short message is preferably a text message, which consists of letters or numbers. One example of a text message or binary message is a message which is generated according to the known technology of Short Message Service and which is also referred to as SMS.

If the short message is or comprises a binary content this short message may be referred to as binary SMS. Binary SMS are coded differently than text messages and may according to the invention serve for sending proprietary or standardized requests, in particular commands, directly to the communication module, to change settings at the external device or to set a mode.

The transmission of short messages, in particular text messages or binary messages in the form of SMS is standardized according to the network protocol Short Message Peer to Peer (SMPP).

If the request message and/or the response message are short messages or comprise a short message, a simple implementation of the request or of the handling information in the respective messages is possible. The messages in such a case can automatically be evaluated by machines, so that the processing effort and thus the costs of such an evaluation can be kept low.

The method according to the invention is carried out in an environment which is also referred to as a surrounding, wherein the environment preferably is a network environment. Preferably, the environment is a telecommunication network environment. Particularly preferably, the environment is a mobile radio network environment.

If the environment is a network environment, the components, in particular the central handling unit and the communication module are in a network. It is, however, also possible, that other components, for example the external device, is only assigned to a network and does thus not form part of the network but can communicate with the network.

It is particularly preferred that the environment is a mobile radio network environment. That means that the environment is designed for cellular radio communication. In that case, the transmission of messages can in particular be carried out wirelessly. Especially in such networks in order for a request message to be transmitted or for a request to be transmitted, it is necessary that an addressing is performed. The addressing is a unique identification, for example a unique letter and/or number combination. By means of such addressing the request message and/or the request can clearly be transmitted or sent to a specific component. Thereby it is possible that the request message and/or the request in a network environment which may comprise several components are only observed by the desired component.

If the environment is a network environment, in particular a mobile radio network environment, the transmission of the messages is possible in a simple and above all fast manner. In addition, addressing is possible in a simple manner. Finally, in a network environment it is also possible to exchange messages between components which are remotely located to one another.

In particular, the handling unit may be remote to the external device, that means that a remote handling, for example a remote maintenance is possible. This is in particular possible for wireless, in particular mobile radio, networks, since a wired communication connection between the handling unit and the communication module and thus the external device is not necessary.

Since a network environment is used, it for example also becomes possible to simultaneously address several external devices. In particular request messages can be sent for example to several devices, which are located in a certain area.

According to one embodiment of the invention a request message is transmitted from the central handling unit to a communication module in a dialogue session. Thereby a first dialogue between the handling unit and the communication module is opened. A request which is contained in the request message is therein transmitted from the communication module to the external device. This transmission is performed while the first dialogue is still open and opens a second dialogue. The communication module waits for handling information, which is determined, received or generated based on the request. The communication module receives the handling information from the external device. By the receipt of the handling information, the second dialogue is closed or terminated. Furthermore, a response message as part of the first dialogue is generated or a response message which had been established upon receipt of the request message at the communication module is amended in the communication module, wherein the response message or amended response message comprises the handling information of the external device. Thereafter, the response message is transmitted back to the central handling unit in the same dialogue session, whereby also the first dialogue is closed. The dialogue chain thus extends from the central handling unit via the communication module to the external device. The dialogues in the dialogue chain are all performed in the same dialogue session, which had been established by the handling unit.

The request message can preferably be transmitted as a short message, in particular a text message or binary message, particularly preferred as an SMS, from the central handling unit to the communication module in the dialogue session. A request, which is contained in the request message, is then transmitted from the communication module to the external device. The communication module based on the request waits for handling information, preferably handling information which relate to the status of the external device, from the external device. The external device receives the handling information, preferably handling information which relates to the status of the external device, from the external device. In addition, a response message, preferably in the form of a short message, particularly preferable as a conformation message, for example as an SMS, is generated in the communication module, wherein the response message comprises the handling information of the external device. Furthermore, the response message is transmitted back to the central handling unit in the same dialogue session.

Since the method is designed as described above, a feedback on whether the request message and/or the request have been transmitted to the external device can be given in a simple manner. In addition, according to the invention also information on whether and how the request has been implemented at the external device, in particular whether and how the status of the external device has changed due to the request, can be transmitted to a central station, in particular the handling unit, and can be stored and possibly further processed at the central handling unit. Furthermore, the operative costs can be reduced. The implementation of the method can be performed fast and in a simple manner. Furthermore it is possible, that the communication module can be built in a comparatively simple and thus cost efficient manner, as the requirements to the communication module are low. Furthermore, the network resources can be used efficiently and effectively. As the method requires little network resources, it can be implemented in regions, where the network coverage is low. As the preferably used mobile radio networks are standardized networks, the method can be implemented world wide.

According to a second aspect of the invention, a communication module is provided. The communication module serves for handling at least on external device in an environment, wherein the communication module has an interface for receiving a request message in a dialogue session, wherein the communication module has an interface for transmitting a response message back in the same dialogue session. Preferably, these two interfaces are combined in one interface. The communication module is characterized in that the communication module is designed to generate and/modify a response message by integrating handling information into the response message which is a conformation message on the receipt of the request message at the communication module, the communication module further has an interface for communication with the external device during the same dialogue session, and in that the communication module has an integrating unit for integrating handling information which was received from the external device into the response message.

Since in the communication module according to the second aspect of the present invention means are provided, which is used for carrying out the method which has already been described, reference is made to that description and it is incorporated by reference at this point. In the following therefore only features of the communication module and the means which are contained therein, are described, which have not already been described in context with the method of the invention according to the first aspect of the invention or which are considered to be worth mentioning again. Means of the communication module are in particular interfaces as well as units. These means may be implemented in the communication module as hardware and/or software. The means may at least partially be combined into one unit.

The communication module has several interfaces. The interfaces may be designed as software or hardware.

It is example provided, that the communication module has an interface for receiving a request message. The interface or an interface which is separate to this interface serves for transferring back a response message. It is also provided that the communication module has an interface for communicating with the external device.

The interfaces for receiving a request message and the interface for transmitting back the response message are preferably combined in one single interface. The interfaces are preferably designed for bidirectional communication. Via this interface or these interfaces the dialogue with the central handling unit and/or the message service server is performed.

The interface for communication with the external device is preferably designed for transmission of a request to an external device. Furthermore, the interface is preferably designed for communication with an external device for receiving handling information, which relate to the request which has been transmitted to the transmitted request. Via this interface the dialogue with the external device is carried out.

Preferably, the communication module has an extraction unit for extracting the request from the request message.

Furthermore, the communication module has an integrating unit for integrating handling information which was received from the external device into a response message. That means that the integration which has been described with respect to the method of the invention according to the first aspect of the invention, can be carried out by means of the integrating unit.

The integrating unit is also referred to as means for integrating of in particular handling information which has been received from the external device into the response message.

It is also possible that the communication module has means, with which a response message can be generated.

With the communication module a request message can be received and a response message can be transmitted in a simple manner. The handling information can be integrated in the response message by the or with the communication module in a simple manner.

Preferably, the interface for receiving a request message is designed as an interface for communication with the message service server, in particular for receiving a request message from the message service server and for transmitting back a response message to the message service server.

As already explained above with respect to the method according to the invention according to the first aspect of the invention, the dialogue session can be established via the message service server. That means that a message service server is provided between the communication module and the central handling unit. In this case, the communication between the communication module and the central handling unit can be carried out via the message service server. The message service server in that case is part of the dialogue session. For such a case, the interface for receiving a request message and the interface for transmitting a response message back is configured or designed in such a way, that the messages can be received from the message service server or transmitted back to the message service server. Therefore, this interface may serve for the dialogue between the message service server and the communication module. The further interface of the communication module serves for the dialogue of the communication module with the external device. The dialogue chain in that case thus comprises the dialogue central handling unit/message service server, the dialogue message service server/communication module as well as the dialogue communication module/external device. The entire communication chain is performed during one single dialogue session.

Since the interface for the dialogue with the message service server is provided at the communication module, a communication of the communication module with the message service server is possible, so that a modification of the messages at the message service server is also possible. The modification of the messages by the message service server has already been described with respect to the method according to the first aspect of the invention, so that reference is made to that description and its entire contents is incorporated by reference at this point.

Preferably, the interface for receiving a request message is designed as an interface for receiving a request message in the form of a short message. Additionally or alternatively, the interface for transmitting a response message back is designed as an interface for transmitting a response message in form of a short message back. It is particularly preferred that these two interfaces are combined in one interface for bidirectional transmission of short messages.

Since the interface at the communication module is designed for transmission and back transmission of messages as short messages, in particular text messages or binary messages, in particular SMS, it is possible to set the content of the messages in a simple manner. For example it is possible in a simple manner to integrate handling information into the response message.

Preferably, the integration unit for integrating of handling information which was received from the external device into the response message has means for inserting the handling information which was received from the external device into a TP-User-Data-Field of an RP-ACK-message.

As already explained above, the TP-User-Data-Field and RP-ACK-message are described in 3GPP standards. The RP-ACK-message has a TP-User-Data-Field. The handling information, which can be transmitted from the external device to the communication module, is to be integrated in the integration unit into the response message. For this purpose, the response message can be generated in the communication module. In order to be able to integrate the handling information into the TP-User-Data-Field, the integration unit has appropriate means.

Because of these means, the handling information can be integrated into the response message in a simple manner. Therefore, in addition, existing resources can be used so that no additional short message has to be sent. Furthermore, the request, in particular the command, and the confirmation of the transmission and preferably the conducting of the command are transmitted in one single dialogue session, so that no further error sources, for example in the addressing of the message occur. Preferably, the request and the confirmation are transmitted in a chain of concatenated dialogues linking components.

Preferably, the communication module has means for conducting the method according to the first aspect of the invention.

According to the third aspect of the invention, a message service server is provided. The message service server serves for handling at least one external device in a environment and has an interface for transmission of a request message in a dialogue session. Furthermore, the message service server has an interface for receiving a response message in the same dialogue session. The message service server is characterized in that the message service server has an interface for communication with a central handling unit in the same dialogue session and in that the message service server has a modification unit for modifying at least one part of the received response message, which is a confirmation message on the receipt of a request message at the component which received the request message for transmission of the response message to the central handling unit.

Since the message service server according to the third aspect of the present invention has means, which are used for carrying out the method which has already been described or for the communication with the communication module according to the invention, at this point reference is made to those descriptions and their entire content is included by reference at this point. Hereinafter, only aspects of the message service server and the means contained therein are described, which have not already been described in context with the method according to the invention according to the first aspect of the invention or which are particularly worth mentioning. Means of the message service server are in particular interfaces as well as units and appliances. These means may be hardware and/or software in the message service server. The means may at least partially be combined in one unit.

The message service server in particular serves for usage in a method for handling an external device in an environment, wherein the external device as well as the environment has already been described in detail above. Like the communication module also the message service server has several interfaces. For example the message service server has an interface for transmission of a request message and an interface for receiving a response message. These two interfaces are preferably combined in one single bidirectional interface. Furthermore, the message service server has an interface for communication with the central handling unit. The interface for communication with the central handling unit is in particular designed as an interface for bidirectional communication. With the interface for communication with the central handling unit for example messages can be received from the central handling unit and can be transmitted to the central handling unit.

The message service server has a modification unit for modifying at least part of the received response message for transmission to the central handling unit. The modification unit will hereinafter also be referred to as means for modifying or modification appliance.

Modifying is in particular understood in such a way, that the response message, which has been transmitted from the communication module to the message service server, is changed or amended. That means that for example information may be added to or removed from the response message. This information, which may be added to the response message may for example be a time stamp or the like. Preferably, the received response message, which is also referred to as a triggered response message or a new response message is modified in such a way at the message service server that the handling information is inserted or implemented into a suitable field of the response message.

With the message service server according to the invention, it is possible in a simple manner that in a dialogue session a request message is transmitted and in the same dialogue session a response message is transferred back to this request message, wherein the response message is transmitted back with handling information, which relate to an external device and are based on the request message. The message service server, which may be a Short Message Service Centre (SMSC) therein serves as a kind of distribution point.

According to a fourth aspect of the invention, a system is provided. The system serves for handling at least one external device in an environment, wherein the system has at least one central handling unit, at least one communication module and least one external device. The at least one external device is assigned to the at least one communication module. The system is characterized in that the communication module is designed according to the second aspect of the invention.

With the system according to the invention, which comprises a communication module according to the second aspect of the present invention, it is possible to transmit a response message to a request message back within the same dialogue session, wherein the response message comprises handling information, which is generated based on the request message.

Preferably, the system has at least one message service server according to the third aspect of the invention.

By using the message service server according to the third aspect of the present invention, the transmission of a request message and a response message within the same dialogue session is further improved, since the request message and/or the response message may be modified by the message service server, which may be arranged between the central handling unit and the communication module. In particular the result of the dialogue between the message service server and the communication module can be integrated into the request message and the dialogue with the communication module can be opened by the message service server.

Preferably, the system has means for conducting the method according to the first aspect of the invention.

If the system has means for carrying out the method according to the first aspect of the present invention, feedback on whether the request message has been transmitted and/or whether the request has been transmitted to the external device can immediately be obtained in a simple manner. Preferably, in addition, a feedback on whether the request has been implemented at the external device and/or how the status of the external device has changed, is obtained. The implementation of the method is possible in a fast manner. Furthermore, it is possible that the communication module is designed in a simple and cheap manner, as the requirements to the communication module are low. Furthermore, the network resources can be used efficiently and effectively. As the method requires little network resources, the method may also be implemented in regions where the network coverage is low. Furthermore the method is also advantageous over methods, wherein a separate communication, in particular via GPRS is performed. With GPRS a better coverage is required, as the radio interface uses a less robust coding. Since according to the invention standardized interfaces can be used without modification in the dialogue session and in particular in the dialogue chain(s) in the dialogue session, the method is applicable world wide.

The invention may also be described as follows.

With respect to machine-to-machine communication, a high need exists for a cost efficient, narrowband, fast responding control channel. The invention in particular relates to use cases, wherein a real time response from an external device, for example a remote asset is necessary, in order to signal in the direction of the central handling unit, that a command has been or is being carried out. Application examples with respect to machine-to-machine communication or the M2M-field, which profit from the present invention, are the public infrastructure applications, security applications and superimposed control applications.

Preferably, with the present invention a so called transactional method is used. A short message, which will hereinafter also be referred to as SMS, and in particular a transactional SMS, which is for example transmitted from the message service server to the communication module, triggers a confirmation SMS. Herein, a transactional SMS is transmitted, in that the message service server, for example in a dialogue is instructed by the handling unit, to deliver the SMS without intermittent storage and to report immediately in the same dialogue session on the outcome of the transmission. That means that the sender of an SMS, in particular the message service server, not only can immediately interpret that the SMS has been correctly received, but also receive information characterising the outcome of an M2M command to the external device. This confirmation can then be transmitted to the handling unit.

A transactional mode for the transmission of SMS in a mobile network is for example standardized in the Short Message Peer-to-Peer-Protocol-Specification (SMPP). In this standard also the mostly used store and forward mode and the corresponding store and forward SMS are defined.

According to that definition, the SMS arrives either through Submit SMS, SMPP or a different interface. Instead of storing the SMS, according to the present invention, the message service server, which may be an SMSC, immediately opens an ForwardShortMessage MAP TCAP dialogue and transmits the SMS. In addition, the transaction message mode allows for the sender of the SMS to receive a confirmation, which shows that the message has successfully been delivered or which shows, that the message could not be successfully been delivered to the target address. With the method according to the invention, the confirmation message is transmitted in a single dialogue session which has been established due to the request message.

With the present invention, a communication module in the form of a cellular device with an interface to the external device, for example an external resource is provided. The external resource is remotely controlled by a central handling unit, for example a control unit. This is carried out via an application at the handling unit, which uses SMS communication.

The SMS is transmitted from the central handling unit via the communication module to the external device and triggers an action in the direction of the external device. This action may for example be the transmission of a command to switch a machine on. The communication module waits for a response of the external device, which may for example be such, that a feedback, the machine has successfully been switched on, is provided. After receipt of this response, which represents the handling information, by the communication module, a confirmation SMS is generated or finalized, in which the communication module integrates a text with the corresponding result of the command. The text may for example read that the machine is switched on. Furthermore a date, a timestamp, information on the location, for example of the communication module, may also be provided.

The confirmation SMS, which is a response message according to the invention, is then transmitted back to the central handling unit. Thereby a representative feedback is possible within a dialogue session, so that the central handling unit obtains feedback on the processing of the command. The method according to the present invention preferably uses a delivery acknowledgement message (RP-ACK message) for sending additional information on the result of a transmitted command, which represents the transmitted request within the message.

With methods or appliances which are available to date an immediate feedback channel, that means a response on the implementation of a command within a dialogue session is not available. Only a time shifted confirmation SMS, that means a notification, that the request message has been delivered to a communication module, is available. If and how the request which is contained in the request message has been transmitted to the external device and how the request has been processed there, cannot be communicated to the handling unit.

For the present invention it is advantageous, if it is also supported by the message service server, which may be a Short Message Service Centre (SMSC). The SMSC herein preferably supports the transactional mode. This mode triggers the transmission back of an SMS-Delivery-Report, in the TP-User-Data-Field of which the communication module, which may preferably be an M2M device, inserts the desired information. The SMSC then preferably inserts this information from the TP-User-Data-Field into a SMPP data_sm_response, in order to send the information to the central handling unit, which may also be referred to as M2M server. At the M2M server preferably a corresponding M2M application is installed and executed. The transactional mode means at the SMSC that after the transmission of a message in a dialogue with the communication module, the dialogue is kept open until a response is received from the communication module. At the communication module itself, information, in particular handling information from the external device is received, preferably in a separate dialogue, which is opened during an opened dialogue with the SMSC.

With the present invention an immediate feedback at the central handling unit is thus possible, so that in case of unsuccessful or in rare cases an unconfirmed result of the request, further immediate counter measures or counter steps can be initiated. In addition, the implementation of the present invention can easily be carried out. Since less resources are being used, the operating costs are lower. A rapid global rollout is possible as there are only few impacts to networks. Furthermore it is possible to use reasonably priced devices and to use the network resources efficiently and effectively. It is also possible to use the invention for operation in areas with low network coverage. Since the invention supports all networks, it can be implemented world wide. Furthermore only low costs for narrowband connections arise.

With the invention it is in addition possible, that the command and the result are synchronously sent in the same dialogue session, in particular in the acknowledgement message. In contrast to this, in an asynchronous transmission in a separate dialogue session, the transmission is carried out by means of separate SMS, i.e. separate SMS dialogue.

A further advantage is the reduced complexity of the application and the reduced network load, which is significant with several million SMS which are to be expected in M2M applications.

BRIEF DESCRIPTION OF THE DRAWINGS

The invention will now be described in further detail with respect to an example with reference to the enclosed figures. Herein.

DETAILED DESCRIPTION OF THE INVENTION

Figure 1:
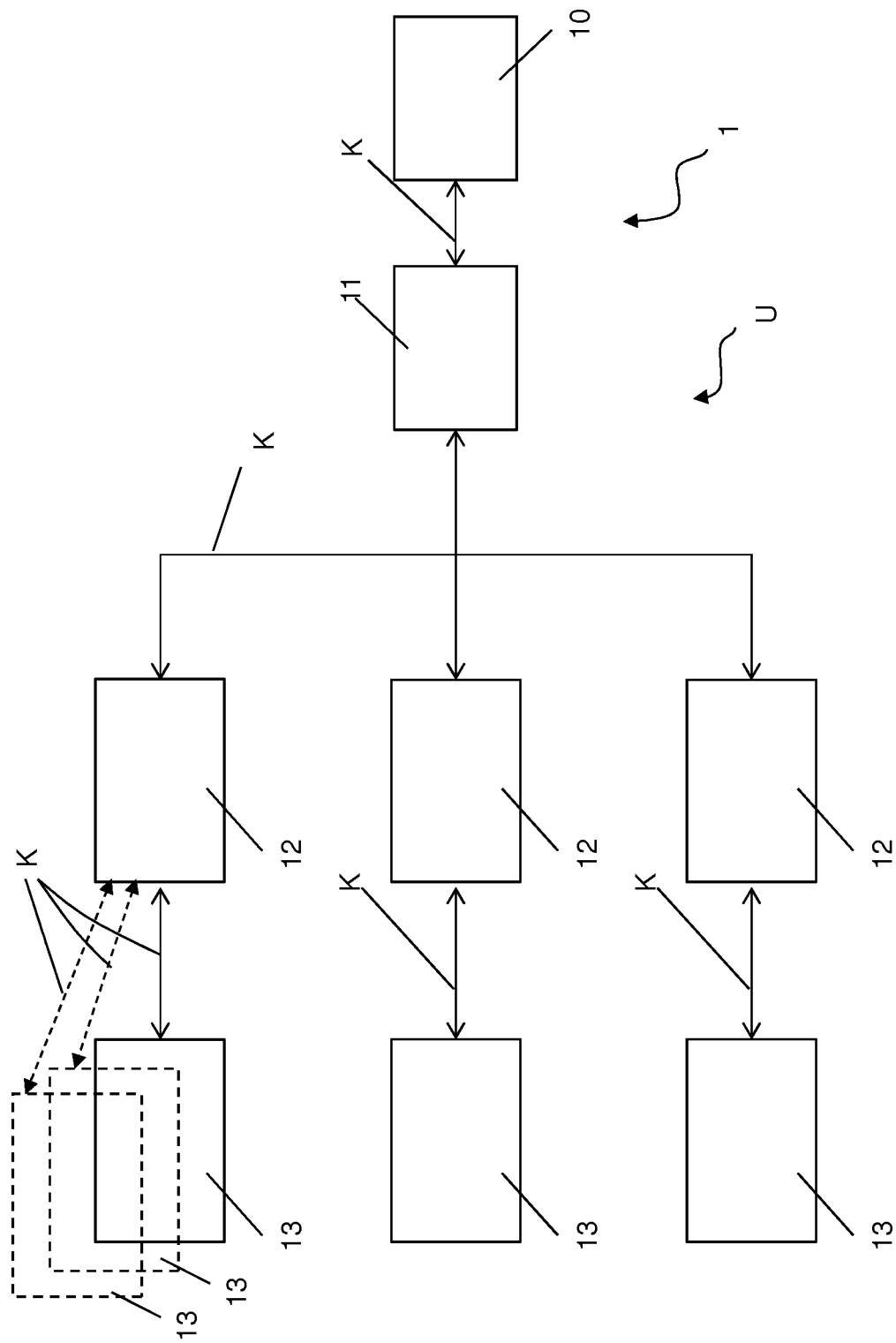
FIG. 1 shows an embodiment of a system for handling external devices in an environment.

In FIG. 1 an embodiment of a system 1 for handling of external devices 13 in an environment U is shown. The environment U will hereinafter also be referred to as surrounding U. More precisely, a system 1 for handling of a total of three external devices 13 is shown in FIG. 1. It is, however, obvious, that more or less than the depicted three devices 13 can be handled with the method of the present invention.

Beside the three external devices 13, the system 1 comprises three communication modules 12 as well as a message service server 11 and a central handling unit 10. A communication K is possible between all components of the system 1. The communication K, which will be described with reference to FIG. 2 as well as the system 1 in greater detail, is a bidirectional communication K.

As already explained, in FIG. 1 three external devices 13 and three communication modules 12 are shown. The three external devices 13 each are assigned to a communication module 12, wherein it is also possible as indicated by the dashed lines in FIG. 1, that several, for example three, external devices 13 are assigned to one communication module 12. Also other assignment constellations are possible.

The system 1 which is shown in FIG. 1 serves for handling the external device 13. This can be performed via the central handling unit 10. A message service server 11 is provided between the central handling unit 10 and the communication modules 12. The communication K between the components is carried out in such a way, that messages are transmitted from the central handling unit 10 to the message service server 11. The messages are transmitted from the message service server 11 to the communication modules 12 or to a specific communication module 12. Information is transmitted from the communication module 12 or the communication modules 12 to the external devices 13. The communication between the central handling unit 10 and the communication modules 12 according to the present invention is referred to as transferring. The communication between the communication modules 12 and the external devices 13 according to the invention is referred to as transmission.

Figure 2:
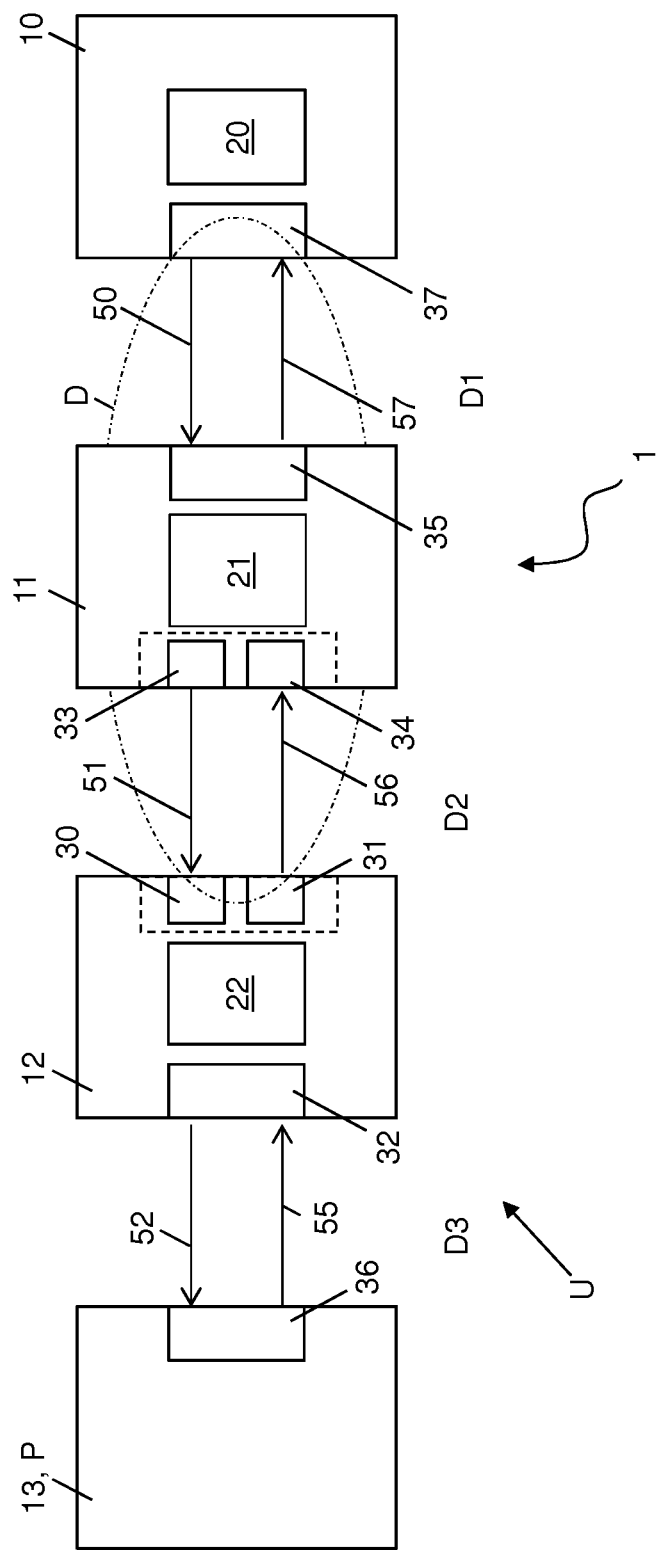
FIG. 2 shows part of the system of FIG. 1 with dialogues in a mobile terminated dialogue session.

In FIG. 2 it is shown in detail how the communication K between the central handling unit 10 and the external devices 13 can be carried out. For a better overview FIG. 2 only shows a part or section of the system which is shown in FIG. 1. This section shows a central handling unit 10 and a message service server 11. In contrast to the three external devices 13 and communication modules 12 which are shown in FIG. 1, FIG. 2 only shows one external device 13 and one communication module 12. The external device 13 which is shown in FIG. 2 is assigned to the communication module 12. As already shown in FIG. 1, a communication is performed between the central handling unit 10, the message service server 11, the communication module 12 as well as the external device 13 in FIG. 2, wherein this communication is described in FIG. 2 in detail.

Before describing amongst other things, the communication in detail, firstly the components, that means the central handling unit 10, the message service server 11, the communication module 12 and the external device 13 are being described. FIG. 2 shows one possible embodiment of the components.

The central handling unit 10 has an application 20, which may also be referred to as an M2M application, as well as an interface of the central handling unit 37. The interface of the central handling unit 37 will hereinafter also be referred to as interface 37. The application 20 is suitable for generating or processing messages. The interface of the central handling unit 37 serves for transmitting and receiving of messages.

The message service server 11 has a modification unit 21. This modification unit 21 is suitable for modifying messages which have been received at the message service server 11. How this can be preformed will be described later. Besides the modification unit 21, the message service server 11 also has interfaces 33, 34, 35. These interfaces 33, 34, 35 serve for communication with the central handling unit 10 or the communication module 12. The interface 35, which can also be referred to as interface for handling unit—message service server—communication 35, serves for communication between the central handling unit 10 and the message service server 11. The interface 33, which is a request message interface 33, serves for transmitting messages from the message service server 11 to communication module 12. The interface 34, which is a response message interface 34, serves for receiving messages from the communication module 12 which are transmitted to the message service server 11. Preferably, the interfaces 33 and 34 are combined in one single interface, which is a bidirectional interface and which is indicated in FIG. 2 by the dashed line.

The message service server 11 can be a Short Message Service Centre (SMSC).

The communication module 12 from FIG. 2 has an integration unit 22. With the integration unit 22 it is possible to integrate additional information into messages. The meaning of integrating additional information into messages will be described later. Besides the integration unit 22, the communication module 12 like the message service server 11 has further interfaces 30, 31, 32. Interface 30 is a request message interface 30, which is designed for receiving messages from the message service server 11. Interface 31 is a response message interface 31 which is designed for transmitting messages from the communication module 12 to the message service server 11. Preferably, the interfaces 30 and 31 are combined in one single interface, which is a bidirectional interface and which is indicated in FIG. 2 by the dashed line. The interface for communication module-external device-communication 32 which will also be referred to as interface 32, serves for communication of the communication module 12 with the external device 13. For the communication with the communication module 12, the external device 13 has an interface 36, which can also be referred to as interface of the external device 36.

The interfaces 30, 31, 32 of the communication module 12, the interfaces 33, 34, 35 of the message service server 11, which have been described, can be combined or separate. It is also possible that the interfaces 30, 31, 32, 33, 34, 35, 36, 37 are embodied as software and/or hardware.

The central handling unit 10, the message service server 11, the communication module 12 and the external device 12 are in a surrounding U and form a system 1.

Since now all essential components of the central handling unit 10, the message service server 11, the communication module 12 and the external device 13 have been described, the method according to the invention shall now be described in detail.

The central handling unit 10 may for example be a central control unit or the like. From the central handling unit 10 for example different external devices 13 may be handled. This means that influence can be taken on the external device 13 from the central handling unit 10. The influence can be such that starting from the central handling unit 10, the external device 13 is controlled, operated, organized and the like. For example, information and commands can be transmitted from the central handling unit 10 to the external device 13, so that the external device 13 carries out an action according to the information or command which has been transmitted or transferred.

In order to be able to generate information or commands for handling, the central handling unit 10 has an application 20. With the application 20 information or commands in form of a request 52 can be generated. That means that the request which is to be transmitted or transferred to the external device 13 is comprised in a request message 50, 51.

The request message 50, 51 is generated or created by the or in the application 20. This can be performed automatically or by a user. In order to transmit or transfer the request message 50, 51 to the external device 13, the request message 50, 51 is transmitted via the interface 37, namely the interface of the central handling unit 37. More precisely put, the request message 50, 51 is transmitted from the central handling unit 10 as original request message 50 from the central handling unit 10 to the message service server 11. That means that in the central handling unit 10 by the application 20 an original request message 50 is generated. The request message 50, 51 relates to the handling of the external device 13.

Figure 3:
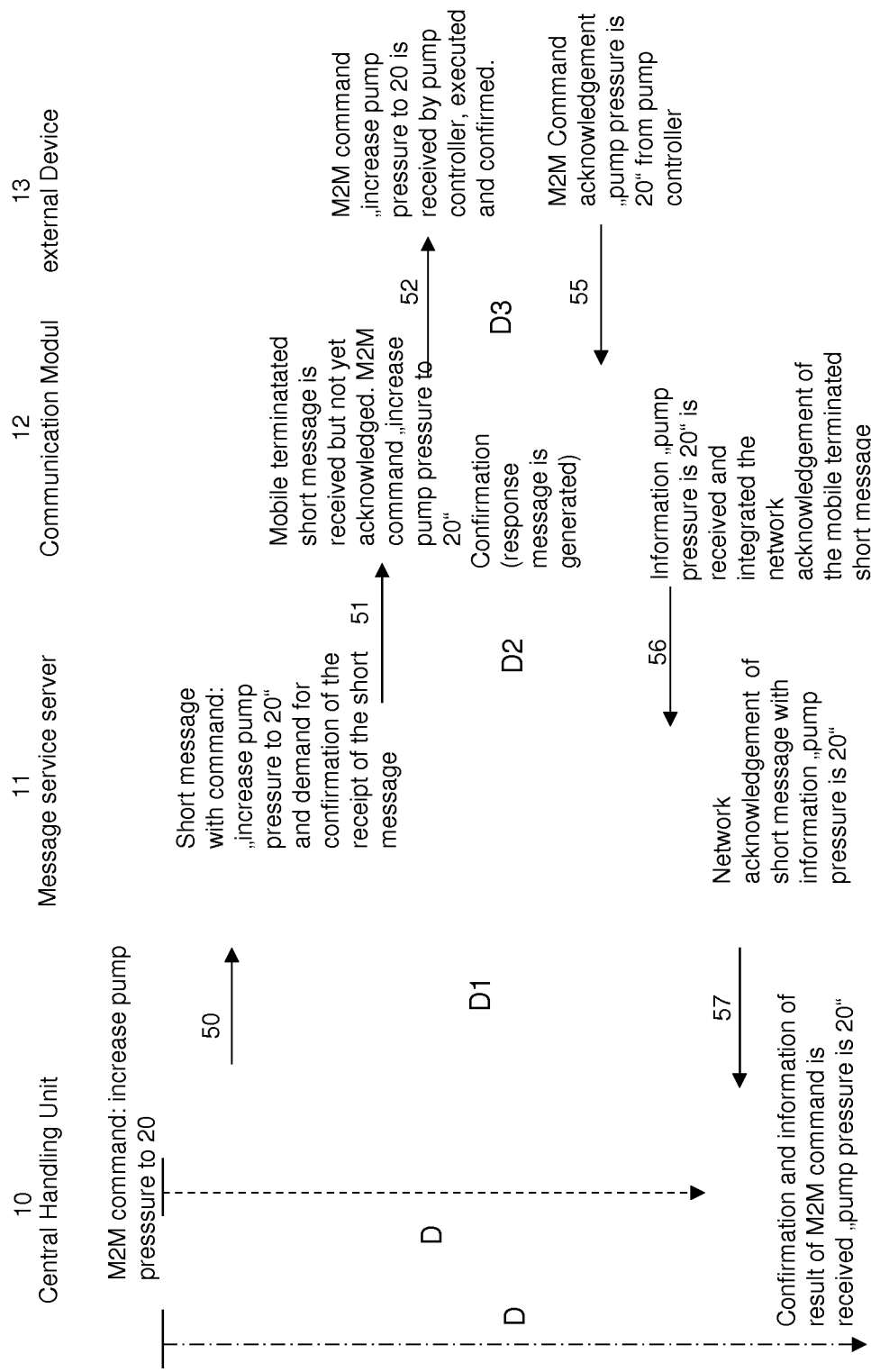
FIG. 3 shows a schematic course of a dialogue chain in a mobile terminated dialogue session.

One possible flow or path of communication between the components is schematically depicted in FIG. 3. At the handling unit 10 a short message, in form of an original request message 50 is generated which includes a request 52 in form of a command "switch on machine" and is transmitted to the message service server 11. By this transmission a first dialogue D1 is opened. At the message service server 11 a demand for confirmation of the receipt of the short message is transmitted together with the command "switch on machine" as extended request message 51 to the communication module 12.

Thereby in an open dialogue D1 a further dialogue D2 is opened. Subsequently, the command "switch on machine", that means the request 52, is transmitted from the communication module 12 to the external device 13 and thereby during the still open dialogues D1 and D2 a third dialogue D3 is opened. As soon as the machine, that means the external device 13, has been switched on according to the command, the information "machine on", which is also referred to as handling information 55, is transmitted to the communication module 12. Thereby dialogue D3 is closed or terminated.

In the communication module 12 a confirmation short message is generated and the information "machine on" is integrated into the confirmation short message by means of the integration unit 22. The information "machine on" which is integrated into the confirmation short message is then transmitted back to the message service server 11 from the communication module 12 as triggered response message 56. Due to the receipt of the confirmation short message with the information "machine on", the dialogue D2 is closed or terminated.

At the or in the message service server 11, the received triggered response message 56 can be modified by the modification unit 21. After modification of the triggered response message 56, a modified response message 57 is transmitted back from the message service server 11 to the central handling unit 10. The modified response message 57 is the acknowledgement of the conformation short message and contains the information "machine on". Due to the receipt of the acknowledgement of the confirmation short message with the information "machine on", dialogue D1 is closed.

By means of dialogues D1 through D3, a dialogue chain is formed, which reaches from the central handling unit 10 to the external device 13.

By generating or transmitting of the original request message 50, a dialogue session D is opened or established. Simply put, this means that the dialogue session D or a context is opened by the generating or transmission of the original request message 50.

If the dialogue session D is defined in such a way that it is terminated by an event which represents the receipt of a response message 57 which relates to the request message 50, the receipt of the acknowledgement of the confirmation short message with the information "machine on" terminates the dialogue session D, which is indicated by the dashed arrow. In this case, the duration of the dialogue session corresponds to the duration of the first dialogue D1.

If the end of the dialogue session D in contrast is defined by the expiry of a time period, it may remain open after the receipt of the acknowledgement, as indicated by the dash-dotted arrow.

The exact course of the dialogues can be as follows. After the original request message 50, which comprises the request 52 for the external device 13, has been generated, it is transmitted to the message service server 11 via the interface 37, that means the interface of the central handling unit 37. The message service server 11 receives the original request message 50 via the interface 35, the interface for handling unit—message service server—communication 35. The receipt of the original request message 50 occurs in the dialogue session D, which has been opened by the central handling unit 10.

In the message service server 11, the original request message 50 is modified via the modification unit 21. The modification of the original request message 50 can be performed in such a way, that the original request message 50 is provided with a date stamp or time stamp. It is also possible that the original request message 50 is modified with respect to its contents. It is also possible that the original request message 50 is provided with a confirmation demand.

It is of course not mandatory that the original request message 50 is modified at the message service server 11. It is also possible that the original request message 50 is transmitted from the message service server 11 without modification.

From the message service server 11, the original request message 50 is transmitted via the interface 33, that means the request message interface 33, as an extended request message 51 to the communication module 12. This is performed in the same dialogue session D. The same dialogue session D continues to exist because the external device takes control of responding to the request and no response 55 has been received at the central handling unit 10 yet.

The extended request message 51, which, as already explained above, may also be the original request message 50, if the original request message 50 has not been modified, is transmitted via the interface 30, the request message interface 30 to the communication module 12.

As already explained above, the original request message 50 is first transmitted from the central handling unit 10 to the message service server 11. From the message service server 11 the extended request message 51 is then transmitted to the communication module 12. This transmission occurs in the same dialogue session D. As the message service server 11 is not mandatory for the transmission of the original request message 50, it is in general also possible, that the original request message 50 is transmitted from the central handling unit 10 to the communication module 12 directly. The interfaces 37, 30, 31 have to be designed accordingly for such a transmission.

After the extended request message 51 has been transmitted to the communication module 12, the request 52 which is contained in the extended request message 51 and in the original request message 50, is transmitted to the external device 13 from the communication module 12. That means that a transmission between the central handling unit 10 and the communication module 12 is carried out. A transfer is performed between the communication module 12 and the external device 13. The transmission includes the transmission of messages, in particular request messages 50, 51 and response messages 56, 57. The transmission comprises the transmission of requests 52 and responses 55, in particular handling information.

The transmission of the request 52 is in particular carried out during the dialogue session D and not within the dialogue session D. That means that the dialogue session D takes place between the central handling unit 10 and the communication module 12. During the dialogue session D means, that a transmission occurs, wherein the transmission occurs while the dialogue session D exists.

After the request 52 has been transmitted from the communication module 12 to the external device 13, wherein the external device 13 has received the request 52 via the interface 36, that means the interface of the external device 36, the request 52 is processed in the external device 13. How this is performed, will be explained later.

The request 52 may for example comprise information relating to the handling of the external device 13. The request may also comprise a command or the like.

If request 52 is a command, the external device 13 may consider or process the request 52 accordingly. Based on this consideration or processing of the request 52, a response 55 is generated, which can also be referred to as handling information 55. The handling information 55 is then transmitted back to the communication module 12 via the interface 36, that means the interface of the external device 36. This is performed during the existing dialogue session D. The communication module 12 receives the handling information 55 via the interface 32, that means the communication module—external device interface 32. In the communication module 12 the transmitted handling information 55 can then be integrated into a triggered response message 56. This is in particular performed by the integration unit 22. That means, during the transmission of the request 52 to the external device 13 a triggered response message 56 may be generated or may be present at the communication module 12 and the handling information 55 may be integrated into this triggered response message 56. The response message 56 which is generated at the communication module 12 may for example be an automated response message 56, for example in form of a confirmation message.

The triggered response message 56 is transmitted via the interface 31, that means the response message interface 31, to the message service server 11 in the same dialogue session D, since the triggered response message 56 relates to the original request message 50 or the extended request message 51. The triggered response message 56 is received at the message service server 11 via the interface 34, the response message interface 34. In the message service server 11 the triggered response message 56 can be modified by the modification unit 21 in such a way that for example information, in particular handling information is read out of the triggered response message 56 and is inserted into a different response message or in the triggered response message 56 at a different location. In addition, the triggered response message 56 can be provided with a date stamp or a time stamp. The triggered response message 56 may then be transmitted back to the central handling unit 10 as a modified response message 57 via the interface 35, that means the interface for handling unit—message service server—communication 35.

The transmitting back of the modified response message 57 is carried out in the same dialogue session D. The modified response message 57 is received at the central handling unit 10 via the interface 37, that means the interface of the central handling unit 37.

As already explained above, the transmission of the request messages 50, 51 and the transmission back of the response messages 56, 57 is carried out in the same dialogue session D. The transmission of the request 52 and the handling information 55 is carried out during the dialogue session D. That means that a request 52, which is related to a context, is started by the application 20 from the central handling unit 10. Only once a response 55, which is related to the context, for example in form of handling information 55 is received at the central handling unit 10, according to one embodiment of the invention, the dialogue session D is closed.

The request messages 50, 51 and/or response messages 56, 57 may in particular be short messages, for example text messages or binary messages. It is also possible, that the request messages 50, 51 and/or response messages 56, 57 comprise short messages, for example text messages or binary messages. One example of a short message is the known SMS.

Preferably, the response message 56, 57 is an RP-ACK message. The handling information 55 in such a case may be implemented in a TP-User-Data-Field, which is provided in the RP-ACK message. This implementing may for example be carried out by the integration unit 22 within the communication module 12 or by the modification unit 21 within the message service server 11. Preferably, the content of the TP-User-Data-Field, in particular the handling information, is read out in the modification unit 21 and is inserted into an SMPP data_sm_response message or a SOAP xml API message. These messages are modified response messages 57 according to this embodiment.

The surrounding U may be a network surrounding. The surrounding may also be a telecommunication network or a mobile radio surrounding.

The method or the course of the method will now be described with respect to an example, wherein the invention is obviously not limited to this example.

As already explained above, the central handling unit 10 may be central control unit. The external device 13 may for example be a pump P. With the method according to the invention, it is now possible to transmit information or commands to the pump P and to transfer a return response in the same dialogue session D, whether a command has been implemented or followed. Existing resources can be used for this purpose. As this occurs in the same dialogue session D, it is possible, that an immediate association or linking of the request 52 and the response 56 or request messages 50, 51 and the response messages 56, 57 is performed in the central handling unit 10.

If the central handling unit 10 wants to provide the external device 13, that means the pump P with a command in the form of a request 52, that the pump is supposed to increase its conveyed volume from 10 liter per minute to 20 liter per minute, the application 20 may generate an original request message 50, for example in the form of a text message, in particular in form of a Short Message Service Message (SMS). That means that the original request message 50 contains the request 52 in the form of a command, that the pump P is to increase its conveyed volume from 10 liter per minute to 20 liter per minute.

As already explained above, this original request message 50 is transmitted to a message service server 11, which may be a Short Message Service Centre (SMSC). For this purpose, a dialogue session D is opened or established. In the message service server 11 the original request message 50 may be modified in such a way, that the original request message 50 is extended by integrating a demand for a delivery conformation, for example in the form of a RP-ACK message. That means, that after the transmission of the original request message 50 a confirmation message in the form of a response message 56, 57 is transmitted back to the central handling unit 10. This back transmission of a confirmation message in form of a response message 56, 57 is carried out in the same dialogue session D. The extended request message 51 is transmitted from the SMSC to the communication module 12, which may be a mobile phone, in the same dialogue session D. The request, that means the command that the pump P is to increase its conveyed volume from 10 liter per minute to 20 liter per minute, is forwarded from the communication module 12 to the pump P. The pump follows the request 52. In order to give a feedback to the central handling unit 10 in the same dialogue session D, that the pump P has received the request and has followed the request, a response 55, for example in the form of handling information 55 is transmitted back to the communication module from the pump P. Thereby, the association of the request 52 and the response 55 is possible in the central handling unit 10. The handling information 55 can be such that the communication module 12 receives the information that the pump P has increased its conveyed volume to 20 liters per minute.

As the original request message 50 had been modified in the SMSC in such a way, that the confirmation of the transmission of the original request message 50 or the extended request message 51 is transmitted back to the central handling unit 10, the handling information 55 can be integrated into the existing triggered response message 56. That means that the triggered response message 56, which is transmitted back from the communication module 12 in the same dialogue session D to the central handling unit 10, on the one hand contains a confirmation that the request message 50, 51 has been transmitted to the communication module 12 and that on the other hand the central handling unit 10 receives a feedback, that the request 52 in form of the command has been considered and implemented by the pump P. It is of course in general possible that the triggered response message 56 only includes the handling information 55. In the present example the central handling unit 10 receives the feedback that the pump P has increased its conveyed volume from 10 liters per minute to 20 liters per minute.

That means that the central handling unit 10 has opened a dialogue session D, by transmitting a request 52 from the central handling unit 10 to the external device 13, that means the pump P. The dialogue session D in this embodiment is closed, once a response which relates to the request has reached the central handling unit 10.

Besides the advantage, that the central handling unit 10 receives feedback to a request 52 in the same dialogue session, it is further advantageous, that existing structures, for example confirmation messages, which are generated with respect to the delivery of a request 52, can be used for the feedback with respect to the request 52. This is carried out by integrating the response 55 into the response message, that means the RP-ACK message.

As a request message 50, 51 is transmitted from the central handling unit 10 to the communication module 12 within the dialogue session and a response message 56, 57 which relates to the request 52 is transmitted back to the central handling unit 10 an association of the request message 51, 52 and the response message 56, 57 can be performed in a simple manner.

Figure 4:
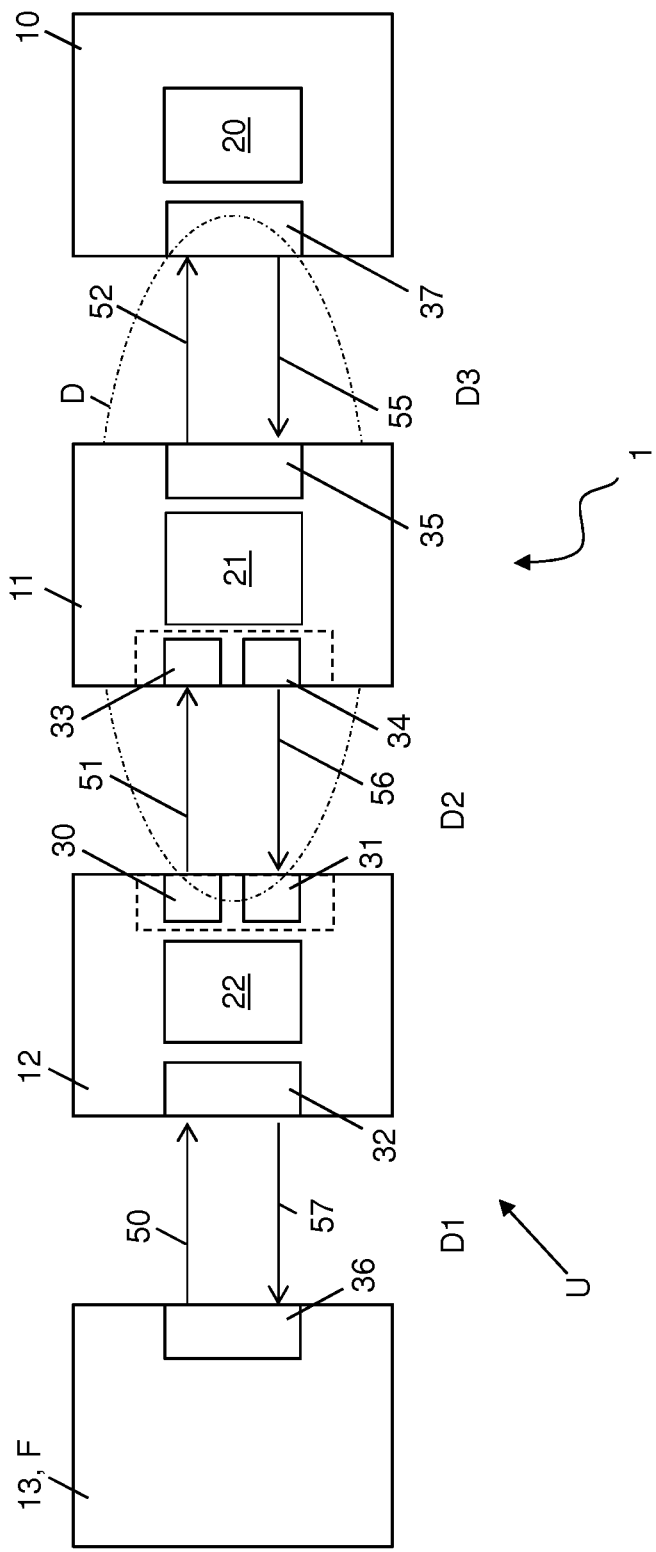
FIG. 4 shows part of the system of FIG. 1 with dialogues of a mobile originated dialogue session.

The invention will now be described again with reference to an embodiment of the inventive method wherein the dialogue session is a mobile originated dialogue session. FIG. 4 shows part of the system of FIG. 1 with the dialogues of a mobile originated dialogue session and FIG. 5 shows a schematic course of a dialogue chain in a mobile originated dialogue session according to one embodiment of the invention.

The components of FIG. 4 correspond to the components shown in FIG. 2 and are thus not described again in detail. With respect to the interfaces shown in FIG. 4 they provide the functionalities as required for the dialogue session which will now described in detail. As is obvious from FIG. 5 in a mobile originated dialogue session, the first dialogue D1 is opened from the external device 13, which in this case may for example be a fire alarm element F. If a fire is detected, the fire alarm element F, i.e. the external device 13, will register a trigger that needs reporting to the central handling unit 10. This trigger can be referred to as a request 52. The external device 13 then sends a request message 50, which may be a transactional short message to the communication module 12. From the communication module 12, this transactional short message is transmitted to the central handling unit 10 via the communication network, in particular via the message service server 11. The extended request message 51, which is sent for that purpose from the communication module 12 to the message service server 11, does not necessarily include more or additional information than the original request message 50. The message service server 11 forwards the short message as a request 52 to the central handling unit 10. The central handling unit 10 will confirm the receipt and validity. In particular the central handling unit 10 will understand the trigger that means the request 52 and possibly additional content of the request message 50, 51. The central handling unit 10 will send a confirmation back to the message service server 11. This confirmation may be referred to as handling information 55 and may for example be in form of an XML message. The message service server 11 will forward the receipt confirmation that means the handling information 55 in a response message 56, for example in the form of a SubmitSMS Ack, message back to the communication module 12. The communication module 12 will then confirm the successful end-to-end submission of the trigger, i.e. the request 52 to the external device 13, i.e. the fire alarm element. The confirmation from the communication module 12 to the external device 13 is also referred to as the modified response message 57.

Figure 5:
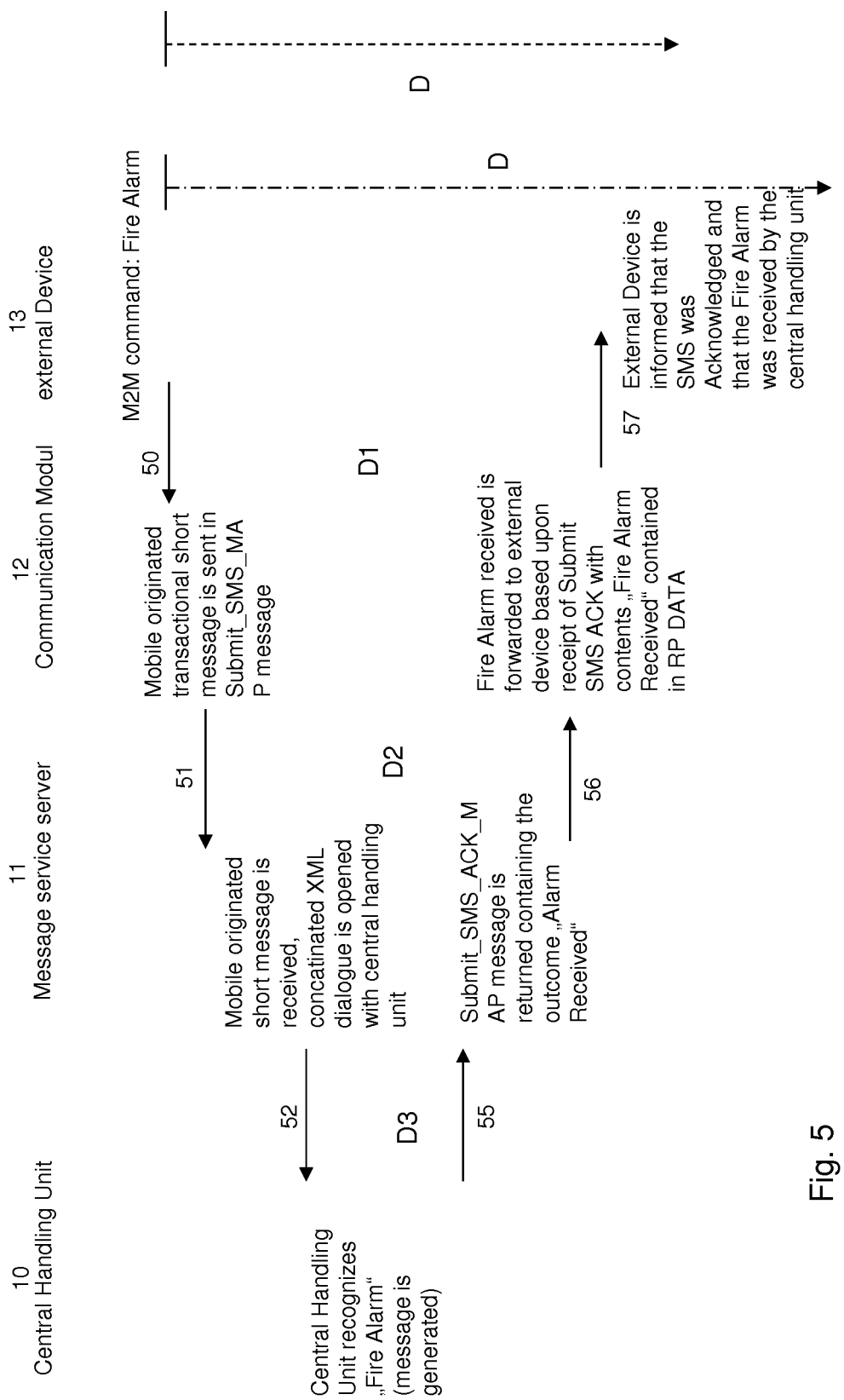
FIG. 5 shows a schematic course of a dialogue chain in a mobile originated dialogue session.

The mobile originated dialogue chain of this embodiment of the invention is also shown in FIG. 5. From this figure it is obvious that the request 52, which may also be referred to as a command or M2M command, in the present example may be "Fire Alarm". The sending of the request to the communication module 12 establishes a first dialogue D1. The extended request message 51, which is sent from the communication module 12 upon receipt of the request 52, in this embodiment is a mobile originated transactional short message which may be sent in a Submit_SMS_MAP message to the message service server 11. Upon receipt of the mobile originated short message, the message service server 11 will open a dialogue D3 which may in this example be an XML dialogue with the central handling unit 10. This dialog D3 is thus concatenated in the dialog D2, which had been established between the communication module 12 and the message service server 11 by sending the Submit_SMS_MAP message. The central handling unit 10 will recognize the request 52, i.e. "Fire Alarm" and respective handling information 55 in form of a message for submission to the message service server 11 is generated. Once this message has been received at the message service server 11 the third dialogue D3 is terminated. At the message service server 11 the handling information 55 "Alarm received" which is the outcome of the third dialog D3 is integrated into a Submit_SMS ACK_MAP message. This response message 56 which includes the handling information 55 is transmitted to the communication module 12. At the communication module 12, the handling information 55, i.e. Fire alarm received, is forwarded to the external device 13 based upon the receipt of Submit_SMS_ACK message with the content Fire alarm received. The handling information is contained in the RP DATA of the message. Thereby dialog D2 is terminated. At the external device 13 the information, that the request message 50, 51 was acknowledged and that the request 52 "Fire Alarm" was received by the central handling unit 10, is received as modified response message 57. The communication between the communication module 12 and the external device 13 in particular the control of acknowledging may be carried out by using a standard modem AT command, for example AT+CNMA, digital cellular telecommunications system (phase 2+), Universal Mobile Telecommunications System (UMTS), AT command set for User Equipment (UE), which is for example defined in 3GPP TS 27.007 version 8.3.0 Release 8).

With the present invention it is thus possible, that clear and immediate feed back on the successful end to end result of an M2M command is realized by employing a single mobile originated or a single mobile terminated short message. No additional short messages are required to provide feed back as the end to end feedback, i.e. the result of the command is contained in the network acknowledgement of the short message, end to end between M2M application and controlled external asset or device.

With the invention, a machine-to-machine-communication can thus be optimized.

REFERENCE NUMBERS

1 System
10 Central handling unit
11 Message service server
12 Communication module
13 external device
20 Application
21 Modification unit
22 Integration unit
30 Request message interface
31 Response message interface
32 Interface for communication module—external device—communication
33 Request message interface
34 Response message interface
35 Interface for handling unit—message service server—communication
36 Interface of the external device
37 Interface of the central handling unit
50 Original request message
51 extended request message
52 Request
55 Response/Handling information
56 triggered response message
57 modified response message
D Dialogue session
D1 Dialogue
D2 Dialogue
D3 Dialogue
K Communication connection
P Pump
F Fire alarm element
U environment/surrounding

What is claimed is:

1. Method for handling at least one external device (13) in an environment (U), wherein the environment (U) comprises at least one central handling unit (10) and at least one communication module (12), wherein at least one external device (13) is assigned to the at least one communication module (12), and wherein a dialogue session (D) is established between the at least one central handling unit (10) and at least one of the further components of the environment (U), characterized in that, in the dialogue session (D) at least one request message (50, 51) relating to the handling of the external device (13) is transmitted, in that during the existence of the dialogue session (D) a response message (56, 57) relating to the request message (50, 51) is generated, wherein the response message (50, 51) comprises handling information (55), relating to the handling of the external device (13), in that the response message (56, 57) is a confirmation message on the receipt of the request message (50, 51) at a component of the environment (U), namely the response message (56, 57) is an RP-ACK-message and the handling information (55) is implemented into a TP-User-Data-Field of the RP-ACK-message and the response message (56, 57) is transferred back within the same dialogue session (D), in that the request (52) which is included in the request message (50, 51) and the handling information (55) which is included in the response message (56, 57) are transported between the handling unit (10) and the external device (13) in a dialogue chain of at least two concatenated dialogues (D1, D2, D3) during the dialogue session (D), wherein all dialogues (D1, D2, D3) within the dialog chain are established either in mobile originated (MO) or the mobile terminated (MT) direction, in that the request message (50, 51) is transmitted in the form of an SMS within the dialogue session (D) from the central handling unit (10) to the communication module (12), a request (52), which is included in the request message (50, 51), is transmitted from the communication module (12) to the external device (13), the communication module (12), on the basis of the request (52), waits for handling information (55), which relates to the condition of the external device (13), from the external device (13), the communication module (12) receives the handling information (55), which relates to the condition of the external device (13), from the external device (13), a response message (56, 57), in form of a confirmation message is generated in the communication module (12), wherein the response message (56, 57) comprises the handling information (55) of the external device (13), and in that the response message (56, 57) is transmitted back to the central handling unit (10) in the same dialogue session (D).

2. Communication module (12) for handling at least one external device (13) in an environment (U), wherein the communication module (12) has an interface (30) for receiving a request message (50, 51) in a dialogue session (D), wherein the communication module (12) has an interface (31) for transmitting a response message (56, 57) back in the same dialogue session (D), characterized in that the communication module (12) is designed to generate and/or modify the response message (56, 57) by integrating handling information (55) into the response message (56, 57) which is a confirmation message on the receipt of the request message (50, 51) at the communication module (12), in that the communication module (12) has an interface (32) for communication with the external device (13) during the same dialogue session (D), in that the communication module (12) has an integration unit (22) for integrating handling information (55) which was received from the external device (13) into the response message (56, 57), in that a request (52), which is included in the request message (50, 51), and the handling information (55), which is included in the response message (56, 57), are transported between the handling unit (10) and the external device (13) in a dialogue chain of at least two concatenated dialogues (D1, D2, D3) during the dialogue session (D), via the communication module (12), wherein all dialogues (D1, D2, D3) within the dialog chain are established either in mobile originated (MO) or the mobile terminated (MT) direction, in that the integration unit (22) for integrating handling information (55), which was received from the external device (13), into the response message (56, 57) has means for inserting the handling information (55), which was received from the external device (13), into a TP-User-Data-Field of an RP-ACK-message, in that the communication module (12) has an interface (30) for receiving a request message (50, 51) in form of an SMS in a dialogue session (D) from a central handling unit (10), in that the communication module (12) has an interface (31) for transmitting a response message (56, 57) back in the same dialogue session (D), in that the communication module (12) is designed to generate and/or modify a response message (56, 57) by integrating handling information (55) into the response message (56, 57) which is a confirmation message on the receipt of the request message (50, 51) at the communication module (12), in that the communication module (12) has an interface (32) for communication with the external device (13) during the same dialogue session (D) for transmitting a request (52), which is included in the request message (50, 51), from the communication module (12) to the external device (13), wherein the communication module (12) on the basis of the request (52) waits for handling information (55), which relates to the condition of the external device (13), from the external device (13) and wherein the communication module (12) receives the handling information (55), which relates to the condition of the external device (13), from the external device (13), and in that the communication module (12) has an integrating unit (22) for integrating handling information (55) which was received from the external device (13) into the response message (56, 57).

3. Message service server (11) for handling at least one external device (13) in an environment (U), wherein the message service server (11) has an interface (33) for transmission of a request message (51) in a dialogue session (D), wherein the message service server (11) has an interface (34) for receiving a response message (56) in the same dialogue session (D), characterized in that the message service server (11) has an interface (35) for communication with a central handling unit (10) in the same dialogue session (D), in that the message service server (11) has a modification unit (21) for modifying at least one part of the received response message (56) for transmission to the central handling unit (10), in that a request (52) which is included in the request message (51) and handling information (55) which is included in the response message (56) are transported between the central handling unit (10) and the external device (13) in a dialogue chain of at least two concatenated dialogues (D1, D2, D3) during the dialogue session (D) via the message service server (11), wherein all dialogues (D1, D2, D3) within the dialog chain are established either in mobile originated (MO) or the mobile terminated (MT) direction, in that the response message (56) is an RP-ACK-message and in that the handling information (55) is implemented into a TP-User-Data-Field of the RP-ACK-message, in that the request message (51) is transmitted in the form of an SMS within the dialogue session (D) from the central handling unit (10) to a communication module (12), the request (52), which is included in the request message (51) is transmitted from the communication module (12) to the external device (13), the communication module (12), on the basis of the request (52), waits for handling information (55), which relates to the condition of the external device (13), from the external device (13), the communication module (12) receives the handling information (55), which relates to the condition of the external device (13), from the external device (13), a response message (56) in form of a confirmation message is generated in the communication module (12), wherein the response message (56) comprises the handling information (55) of the external device (13), and in that the response message (56) is transmitted back to the central handling unit (10) in the same dialogue session (D).

* * * * *